US012448393B2

(12) United States Patent
Park

(10) Patent No.: US 12,448,393 B2
(45) Date of Patent: Oct. 21, 2025

(54) USE OF NOVEL COMPOUND, FOR PREVENTING, IMPROVING OR TREATING AMYOTROPHIC LATERAL SCLEROSIS

(71) Applicant: PRG S&TECH INC., Busan (KR)

(72) Inventor: Bum-Joon Park, Busan (KR)

(73) Assignee: PRG S&TECH INC., Busan (KR)

( * ) Notice: Subject to any disclaimer, the term of this patent is extended or adjusted under 35 U.S.C. 154(b) by 726 days.

(21) Appl. No.: 17/772,136

(22) PCT Filed: Oct. 30, 2020

(86) PCT No.: PCT/KR2020/015014
§ 371 (c)(1),
(2) Date: Apr. 27, 2022

(87) PCT Pub. No.: WO2021/086101
PCT Pub. Date: May 6, 2021

(65) Prior Publication Data
US 2022/0402930 A1 Dec. 22, 2022

(30) Foreign Application Priority Data

Oct. 30, 2019 (KR) .................. 10-2019-0136458
Nov. 27, 2019 (KR) .................. 10-2019-0154520
Oct. 29, 2020 (KR) .................. 10-2020-0142053

(51) Int. Cl.
*A61P 25/28* (2006.01)
*C07D 493/04* (2006.01)

(52) U.S. Cl.
CPC ............ *C07D 493/04* (2013.01); *A61P 25/28* (2018.01)

(58) Field of Classification Search
CPC ..... C07D 231/56; C07B 2200/13; A61P 9/00; A61P 25/28
(Continued)

(56) References Cited

U.S. PATENT DOCUMENTS

2014/0039010 A1 2/2014 Park et al.
2016/0168267 A1 6/2016 Montrasio et al.
2017/0129904 A1 5/2017 Park et al.

FOREIGN PATENT DOCUMENTS

CN 103380145 A 10/2013
CN 107613976 B 7/2021
(Continued)

OTHER PUBLICATIONS

Kyeong Lee et al., "Synthesis of (S)-(+)-decursin and its analogues as potent inhibitors of melanin formation in B16 murine melanoma cells", European Journal of Medicinal Chemistry, 2010. 12. vol. 45. No. 12, pp. 5567-5575.
(Continued)

*Primary Examiner* — Taylor V Oh
(74) *Attorney, Agent, or Firm* — Revolution IP, PLLC

(57) ABSTRACT

The present invention relates to a use of a novel compound, for preventing, improving or treating amyotrophic lateral sclerosis (ALS). The present inventors have found that SOD1 aggregation is one of the important causes of ALS, and have proposed the possibility that WT-SOD1 aggregation, caused by suppressing the regulation of intracellular stress or TDP-43, may be a cause of sALS. In addition, the present inventors have discovered the novel compound PRG-A-01 (SLC-B036) as a SOD1 aggregation and misfolding inhibitor. The compound exhibited a protective effect against muscle weakness and movement disorder in an ALS mouse model. According to the result of a histological analysis, intraspinal nerves were maintained by means of a treatment using PRG-A-01 (SLC-B036). In addition, the present inventors have obtained a candidate compound (PRG-A-04) which can be a more optimized drug. Consequently, the compound of the present invention may be
(Continued)

usefully employed in developing a therapeutic agent for ALS.

9 Claims, 11 Drawing Sheets

(58) Field of Classification Search
USPC .......................................................... 514/338
See application file for complete search history.

(56) References Cited

FOREIGN PATENT DOCUMENTS

| EP | 3162803 A2 | 5/2017 |
|---|---|---|
| KR | 10-2012-0037896 A | 4/2012 |
| WO | 03-087082 A1 | 10/2003 |
| WO | 2012-128521 A2 | 9/2012 |
| WO | 2012/167086 A2 | 12/2012 |

OTHER PUBLICATIONS

Linda K. McLoon et al., "Wnt and Extraocular Muscle Sparing in Amyotrophic Lateral Sclerosis", Investigative Opthalmology & Visual Science, Sep. 2, 2014, vol. 55, No. 9, pp. 5482-5496.

International Search Report for PCT/KR2020/015014 mailed Feb. 3, 2021 from Korean Intellectual Property Office.

Lee, J.-H. et al., "Synthesis and evaluation of (+)-decursin derivatives as inhibitors of the Wnt/β-catenin pathway", Bioorganic & Medicinal Chemistry Letters, vol. 26, Issue 15, Aug. 1, 2016, pp. 3529-3532.

Li, L. et al., "Protective effects of decursin and decursinol angelate against amyloid β-protein-induced oxidative stress in the PC12 cell line: the role of Nrf2 and antioxidant enzymes", Bioscience, Biotechnology, and Biochemistry, vol. 75, Issue 3, Mar. 23, 2011, pp. 434-442.

Zhang, J. et al., "Anti-cancer and other bioactivities of Korean Angelica gigas Nakai (AGN) and its major byranocoumarin compounds", Anti-Cancer Agents in Medicinal Chemistry, 2012, vol. 12, No. 10, pp. 1239-1254.

Rakhit, R. et al., "Structure, folding, and misfolding of Cu,Zn superoxide dismutase in amyotrophic lateral sclerosis", Biochimica et Biophysica Acta (BBA)—Molecular Basis of Disease, vol. 1762, Issues 11-12, Nov.-Dec. 2006, pp. 1025-1037.

Jee-Hyun Lee et al., "(S)-(+)-Decursin and its Analogues as Inhibitors of Cytokines Secretion Induced by DpE in THP-1/EoL-1 Cell Line", Yakhak Hoeji, 2017, vol. 61, No. 3, pp. 178-187.

Yu et al., "Wnt Signaling is Altered by Spinal Cord Neuronal Dysfunction in Amyotrophic Lateral Sclerosis Transgenic Mice", Neurochemical Research, 38(9), 1904-1913, 2013.

The extended European Search Report of European Patent Application No. 20881417.8 mailed Sep. 21, 2023.

[FIG. 1]
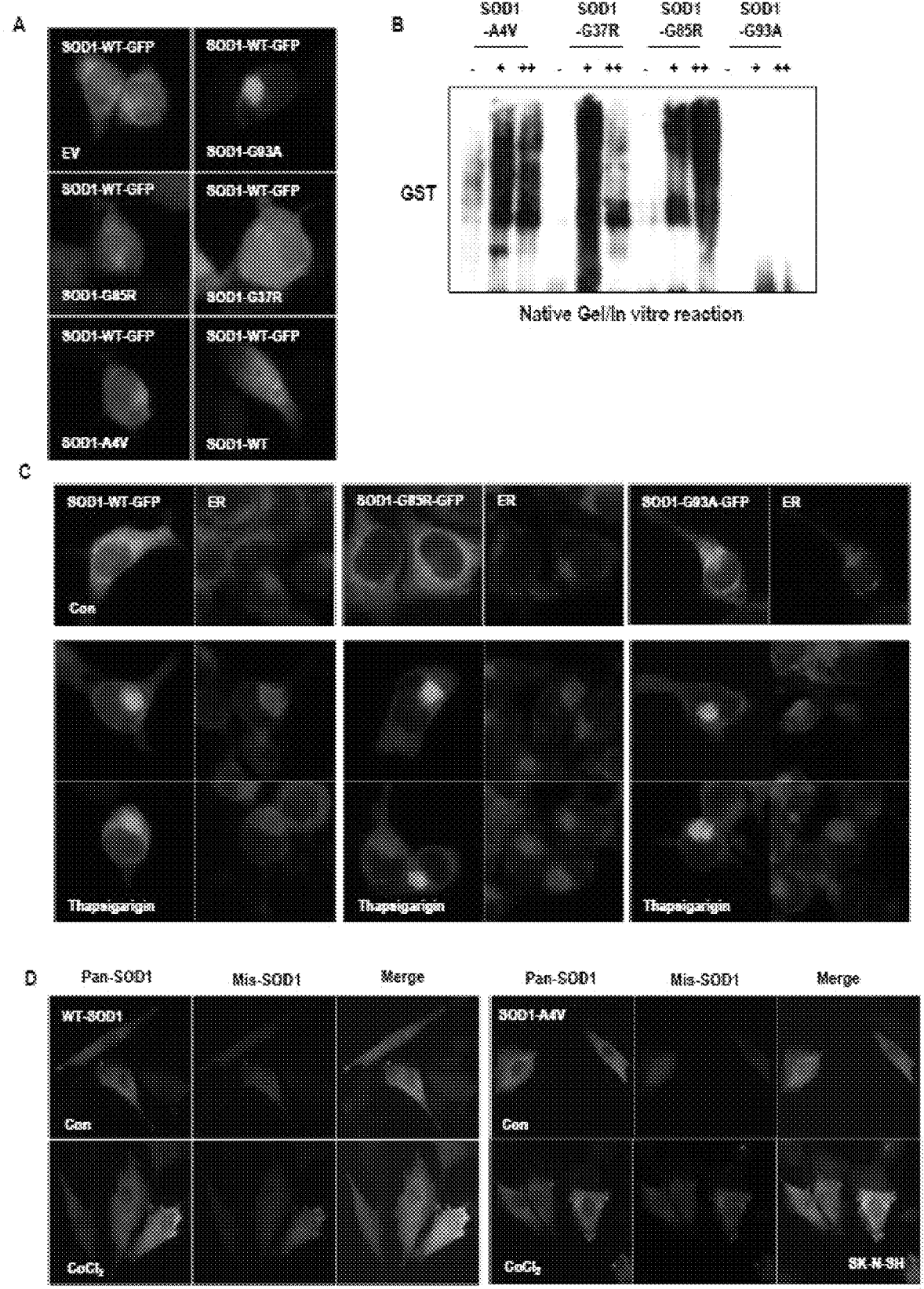

[FIG. 2]
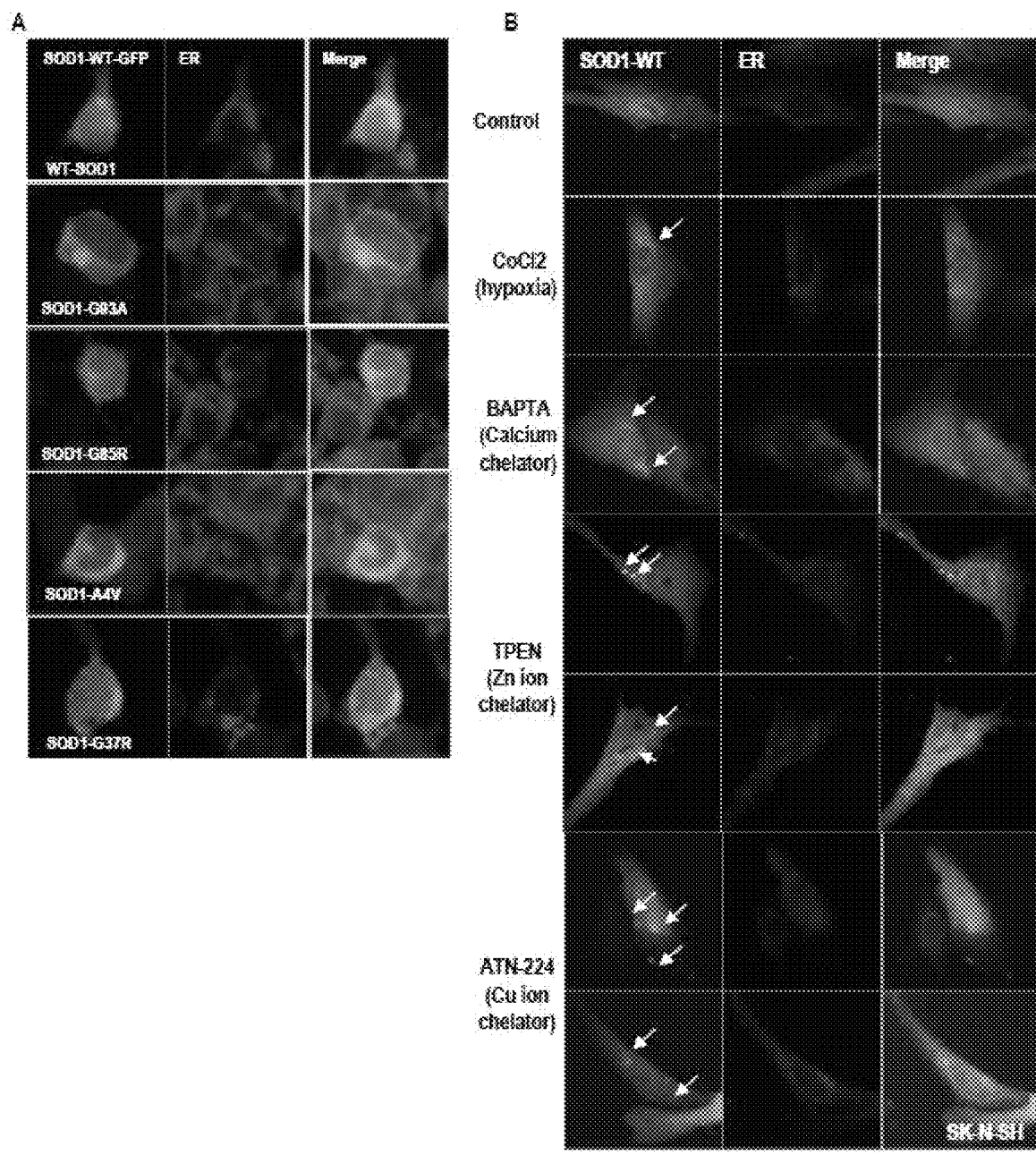

[FIG. 3]
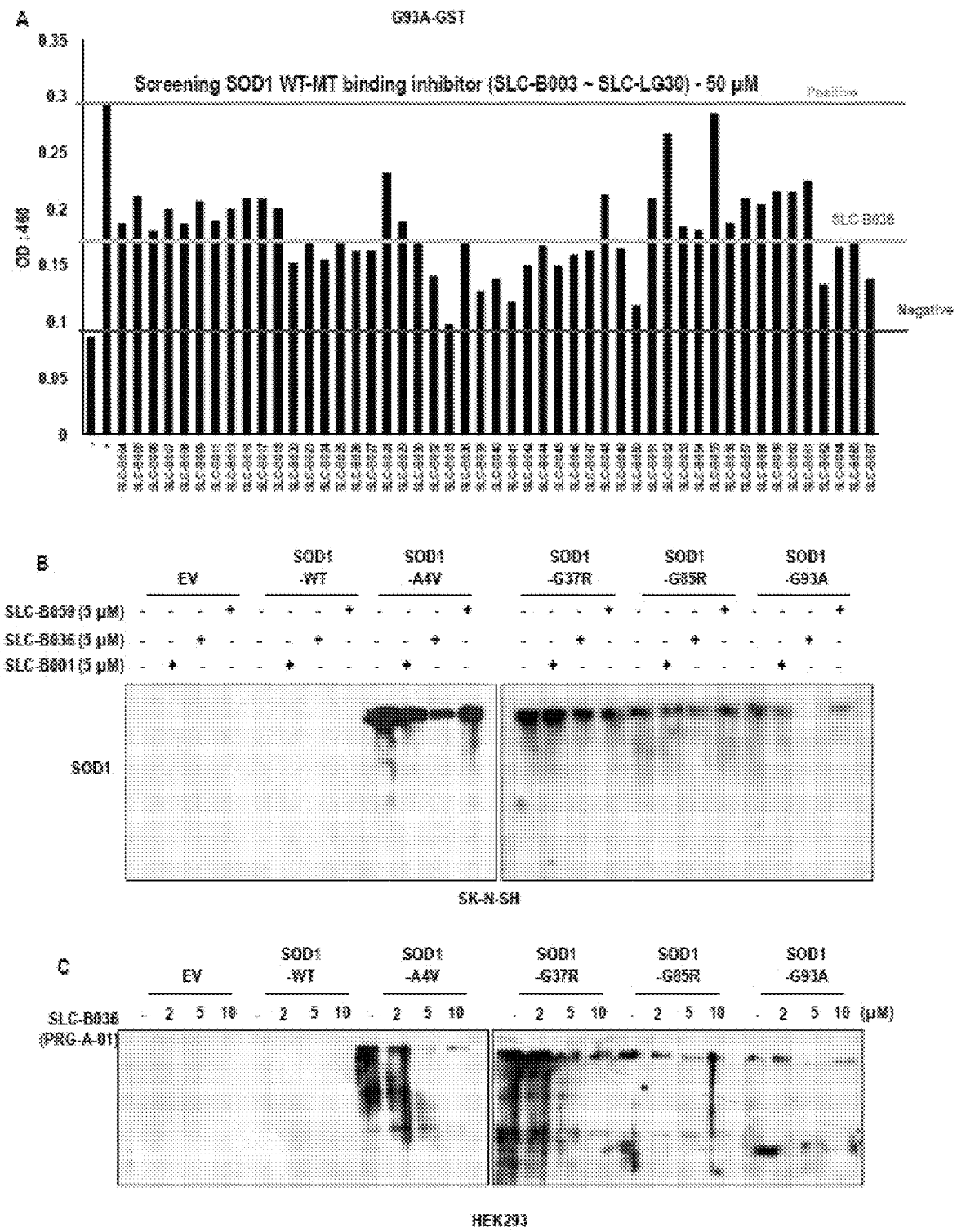

[FIG. 4]
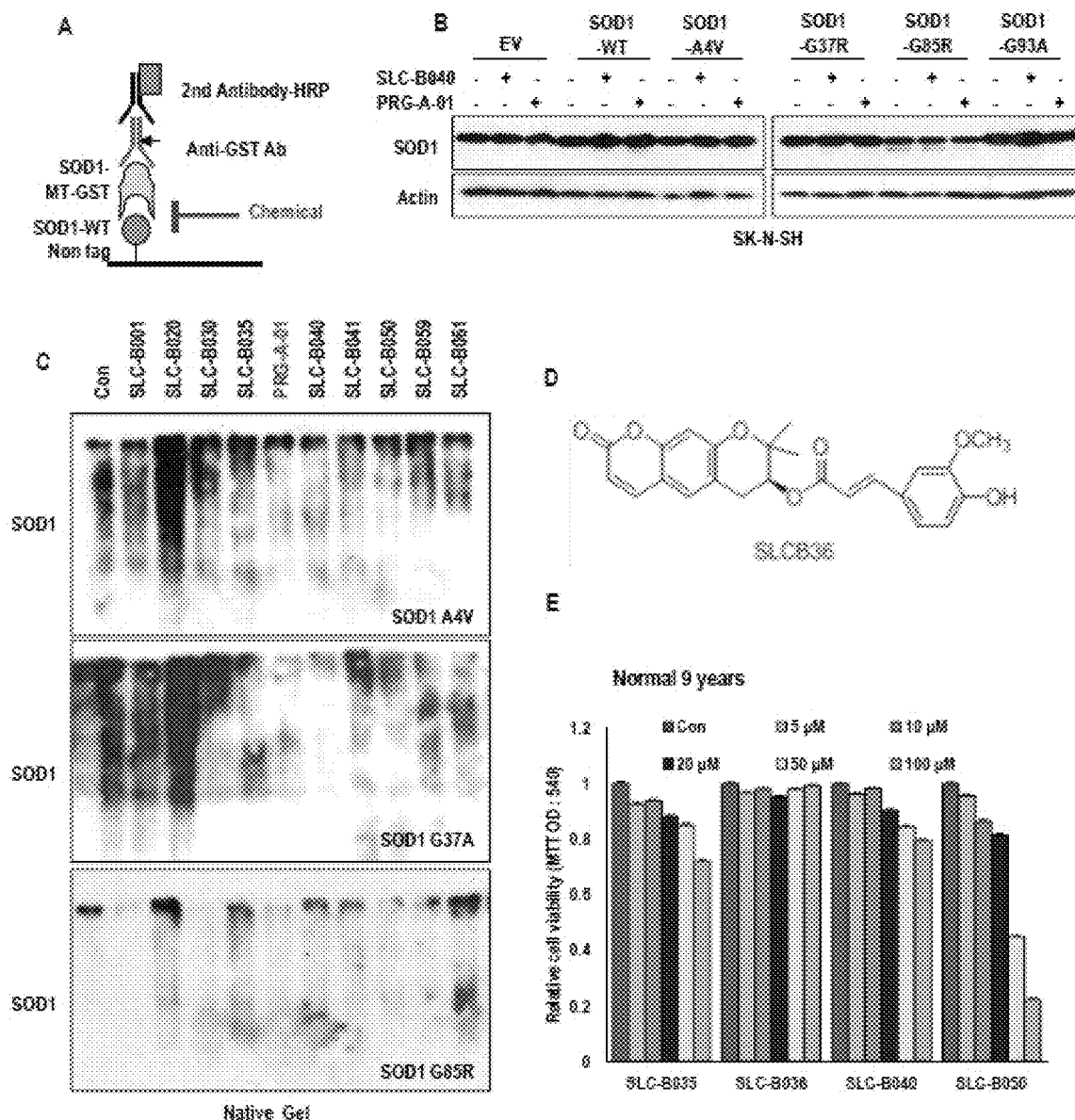

[FIG. 5]
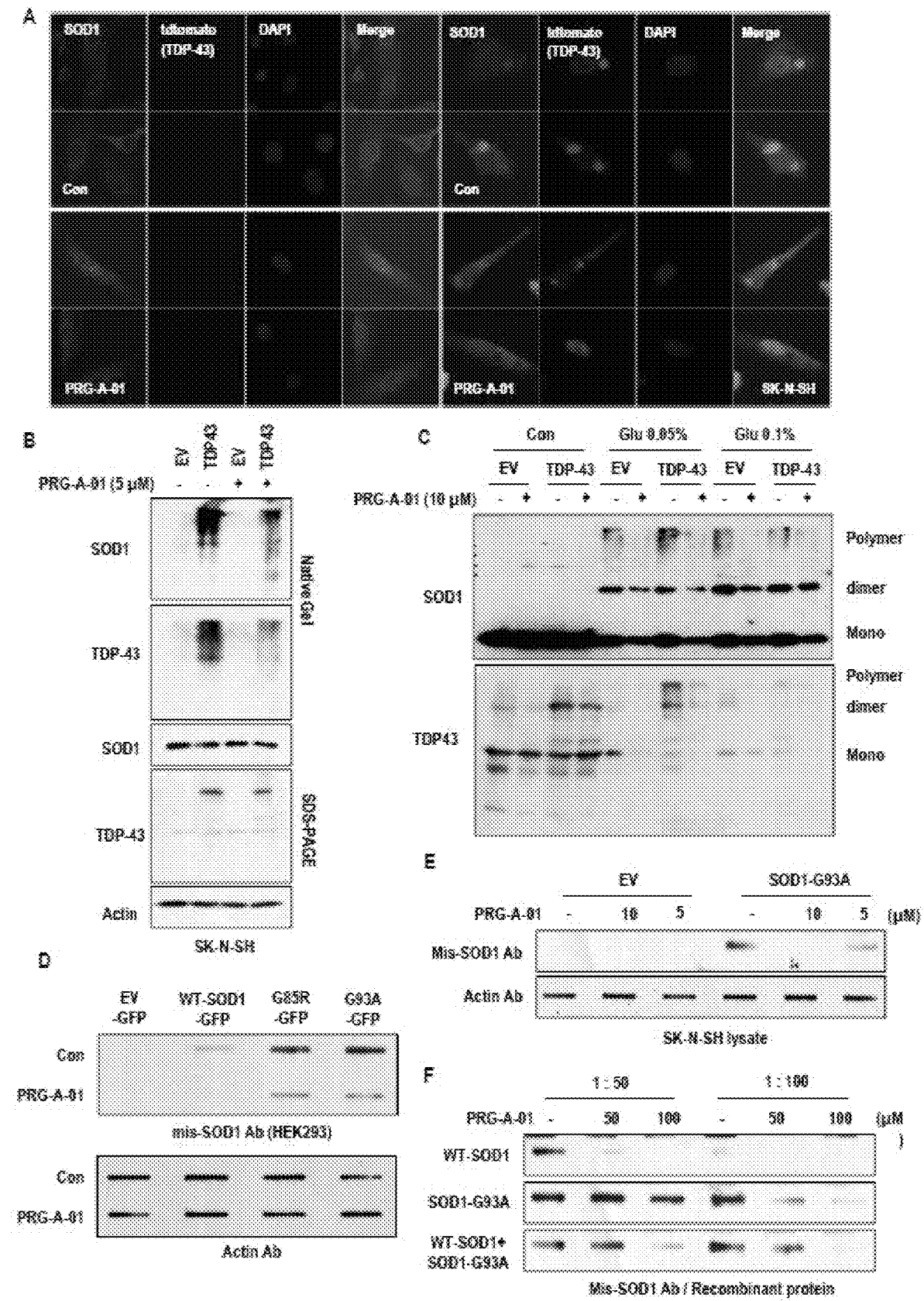

[FIG. 6]
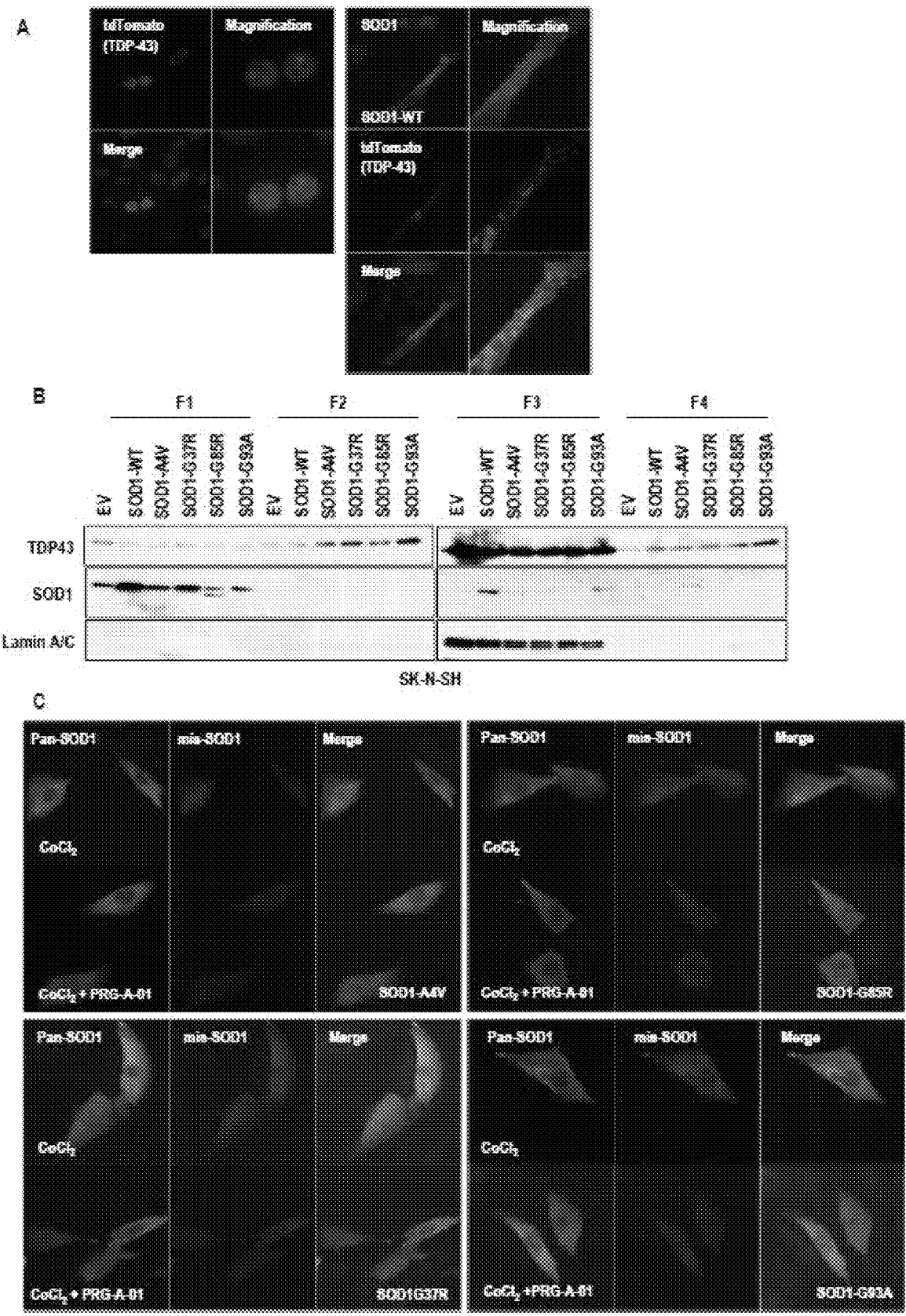

[FIG. 7]
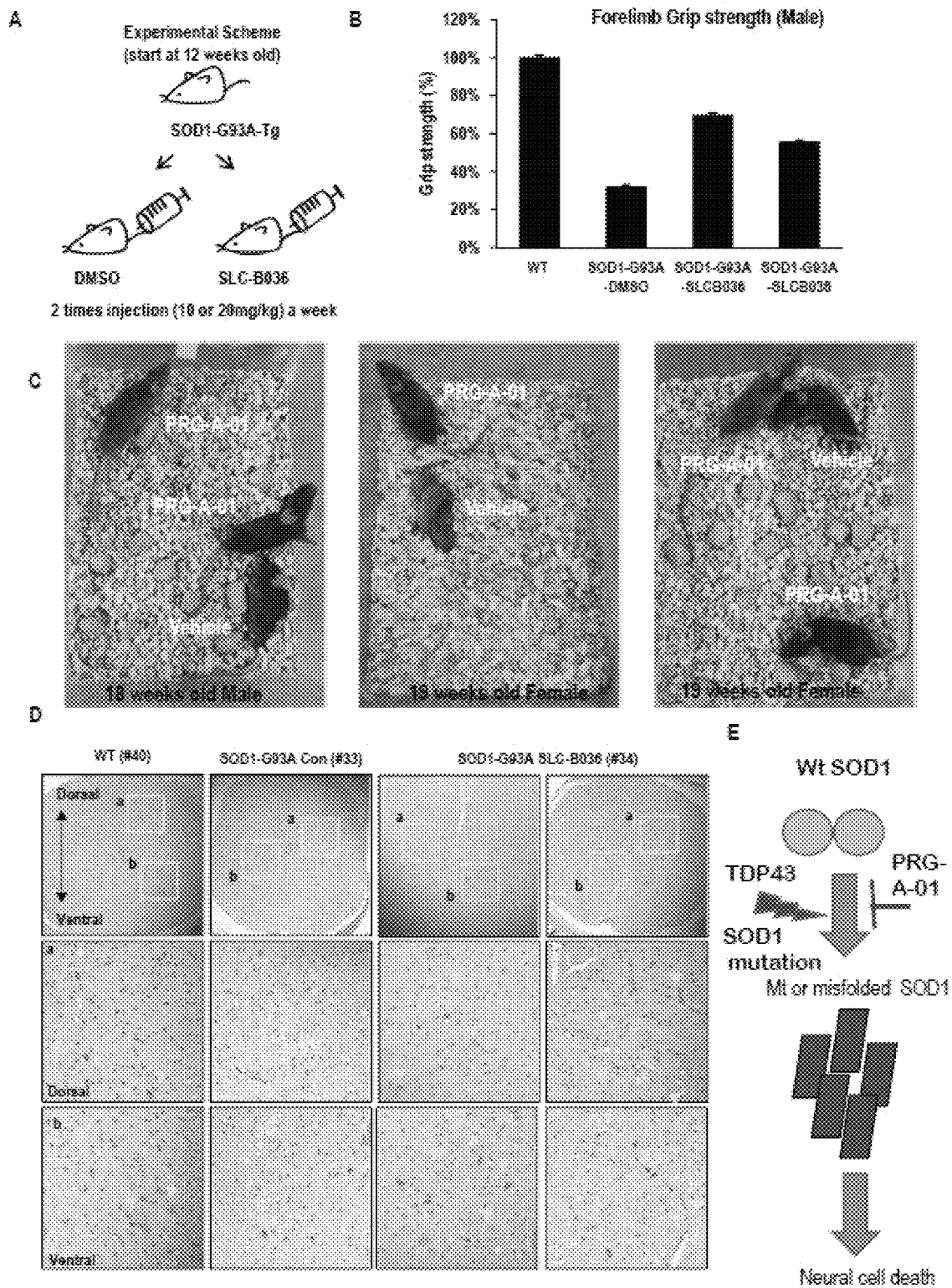

[FIG. 8]
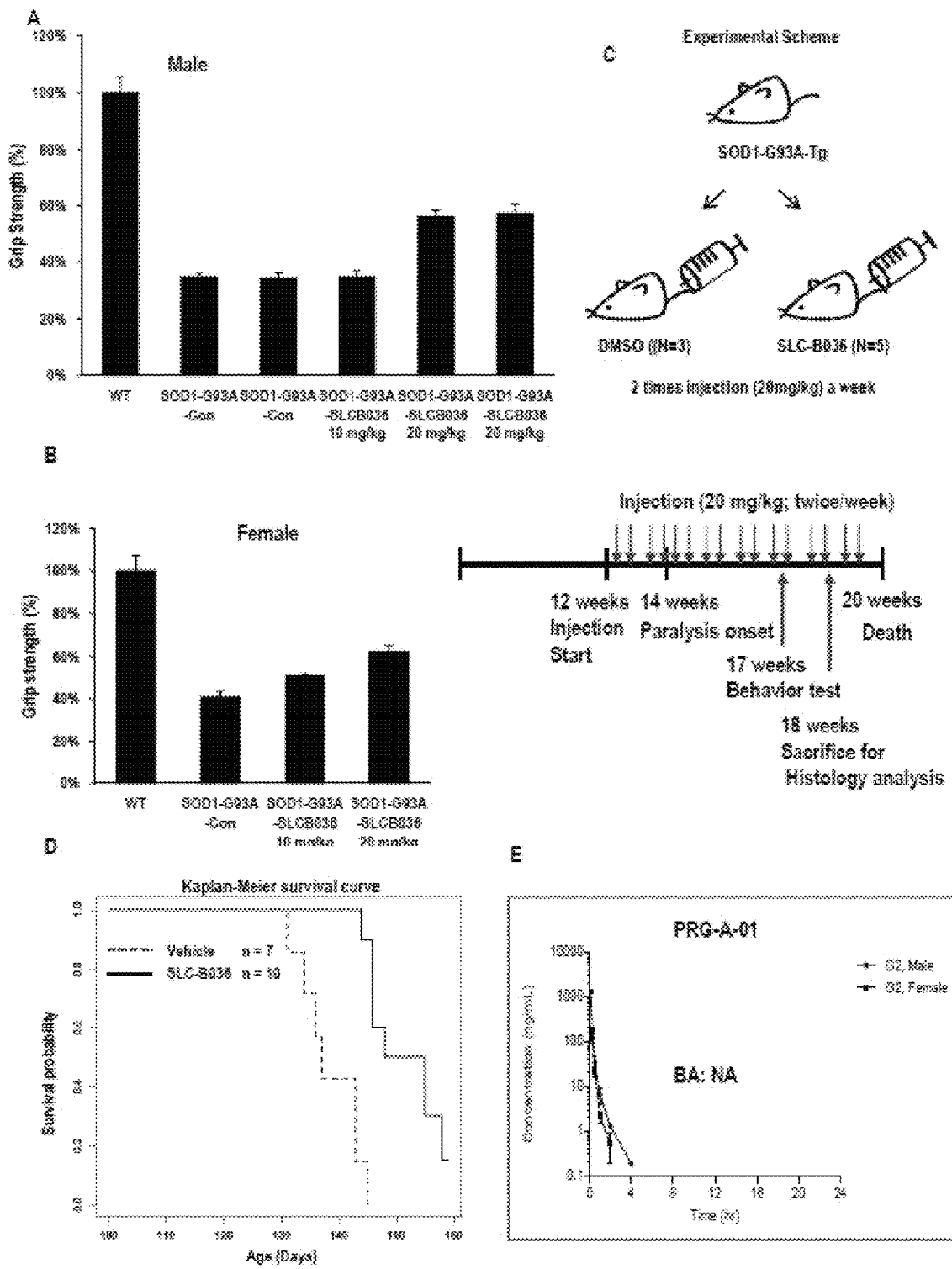

[FIG. 9]
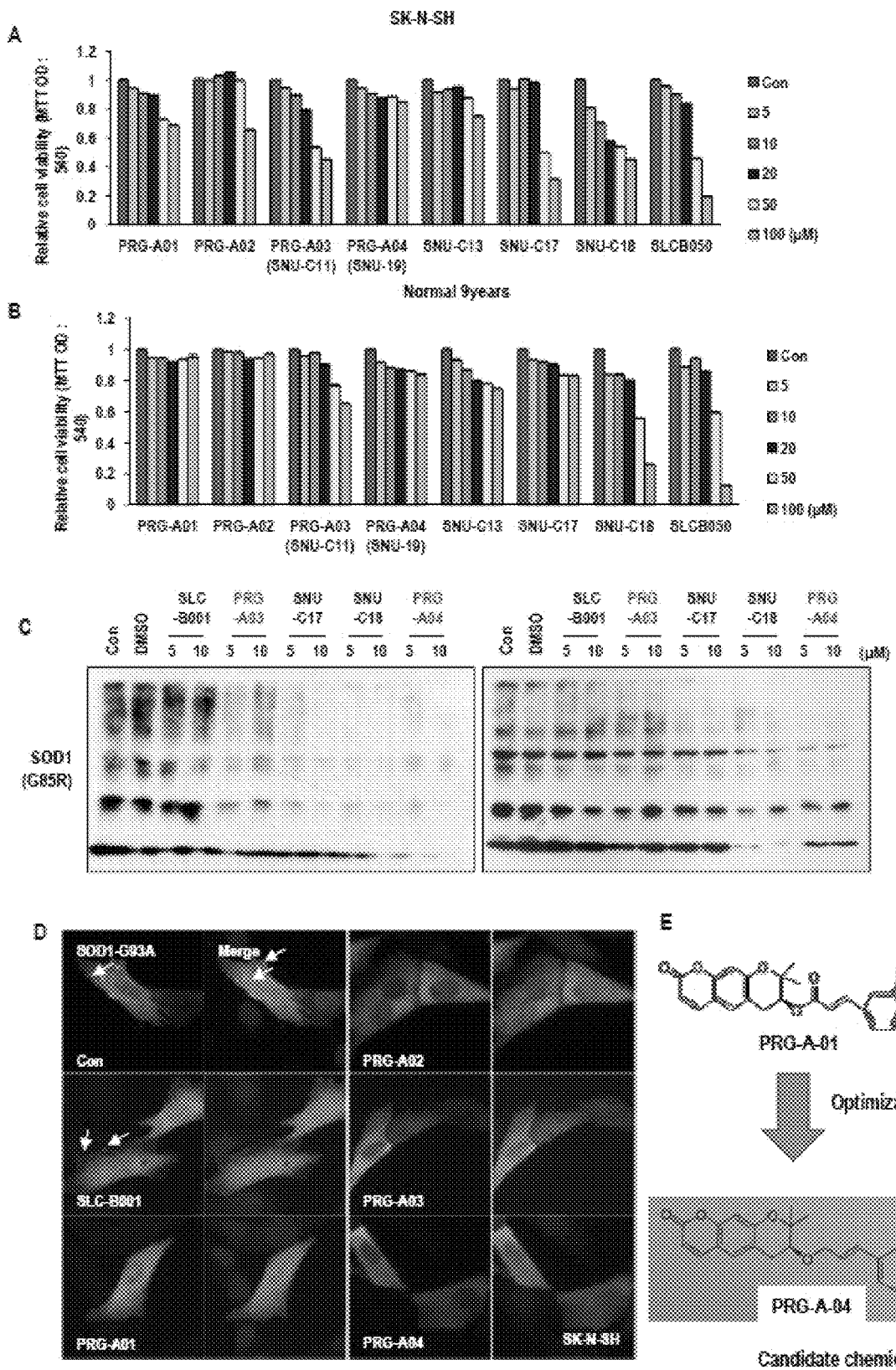

[FIG. 10]
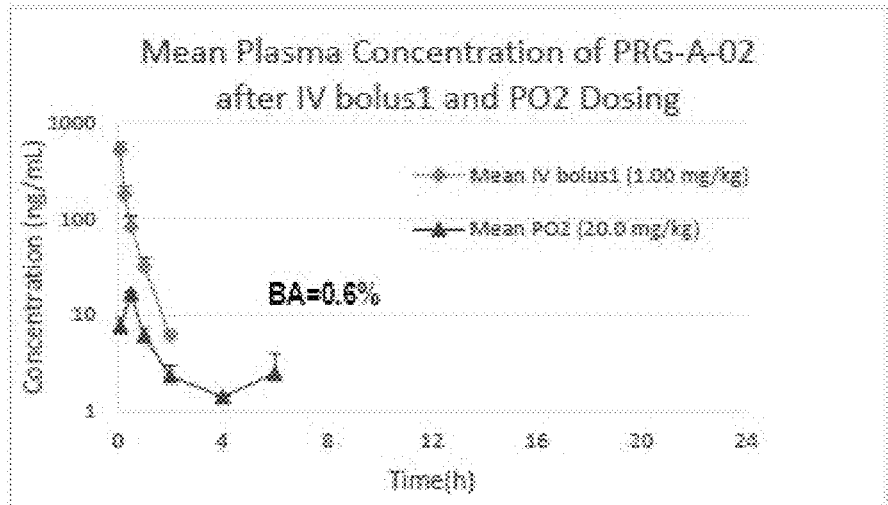
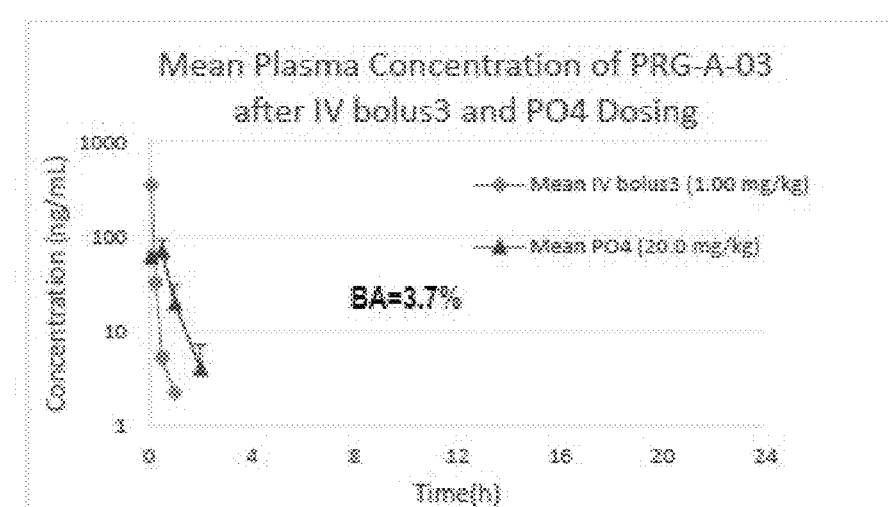
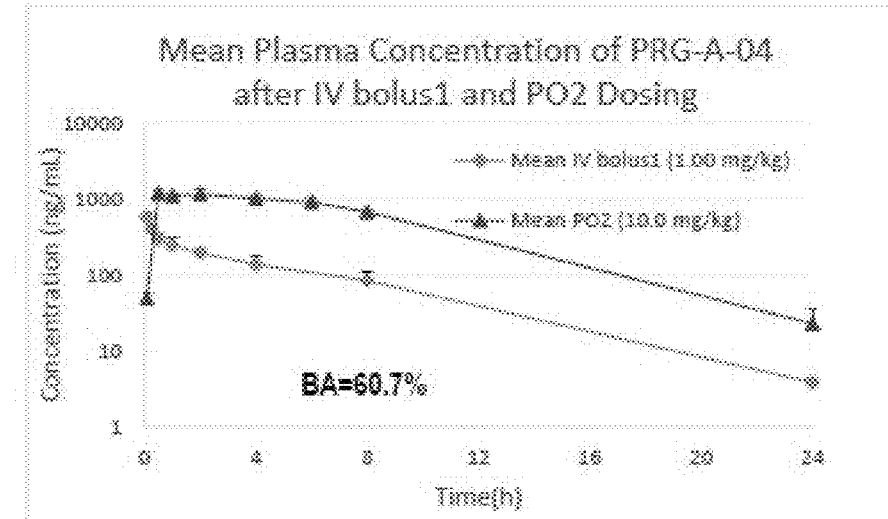

[FIG. 11]
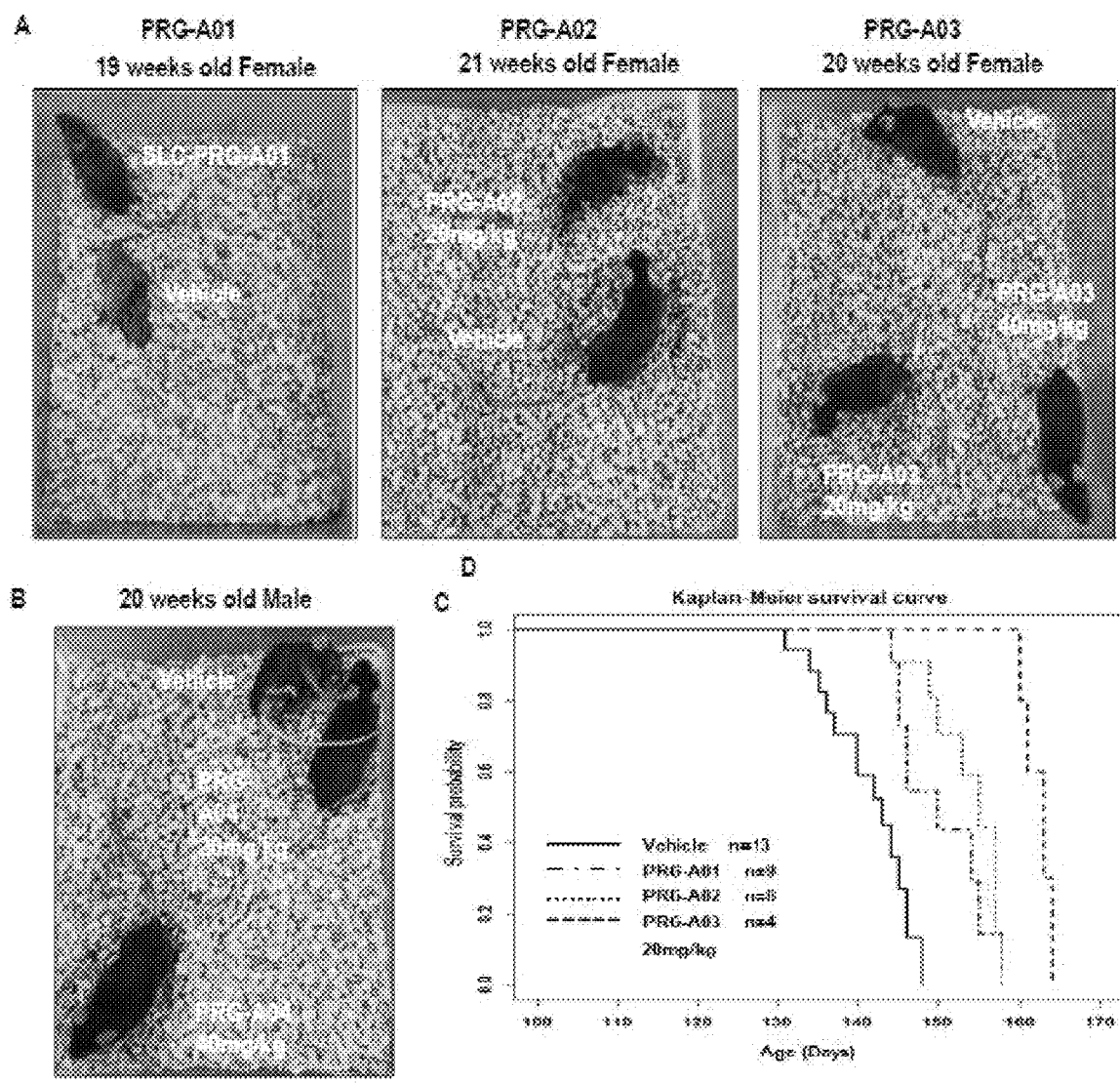

USE OF NOVEL COMPOUND, FOR PREVENTING, IMPROVING OR TREATING AMYOTROPHIC LATERAL SCLEROSIS

CROSS REFERENCE TO PRIOR APPLICATIONS

This application is a National Stage Application of PCT International Patent Application No. PCT/KR2020/015014 filed on Oct. 30, 2020, under 35 U.S.C. § 371, which claims priority to Korean Patent Application Nos. 10-2019-0136458 filed on Oct. 30, 2019, 10-2019-0154520 filed on Nov. 27, 2019, and 10-2020-0142053 filed on Oct. 29, 2020, respectively, which are all hereby incorporated by reference in their entirety.

TECHNICAL FIELD

The present disclosure relates to a use of a novel compound, for preventing, improving or treating amyotrophic lateral sclerosis.

BACKGROUND ART

Amyotrophic lateral sclerosis (ALS) is a fatal neurodegenerative disease, in which motor neurons are selectively lost by cell death in spinal cord. About 10-20% of patients show a genetic pattern (familial ALS; fALS), and the rest are classified as sporadic ALS (sALS). Some genes have been identified at ALS-associated loci in the fALS, among which SOD1 is the first gene identified in the fALS. It is speculated that fALS-related genes also play a role in pathogenesis of the sALS, but exact cause of the sALS is still unknown. In addition, the ALS is classified into typical ALS, ALS with dementia, and atypical ALS according to clinical symptoms. Indeed, mutations in SOD1 cause the typical ALS, and C9orf72 is associated with the ALS with dementia.

One of important characteristics of the ALS is that it is a progressive disease, in which neuronal cell death propagates through neural connections. In fact, Alzheimer's disease and Parkinson's disease have similar phenotypes. In relation to the feature, a prion-like propagation mechanism has been proposed, which refers to transformation of a normal protein into an abnormal protein by a misfolded protein. Indeed, mutant amyloid beta (Aβ) may transform normal Aβ into abnormal Aβ. Recently, it has been reported that mutation or misfolded SOD1 may also be secreted and propagated during disease progression. However, not many studies have been conducted on an SOD1 aggregation and misfolding inhibitor targeting ALS therapeutics.

DISCLOSURE

Technical Problem

The present disclosure relates to a use of a novel compound, for preventing, improving or treating amyotrophic lateral sclerosis.

Technical Solution

To achieve the object, an example embodiment of the present invention provides a compound represented by Formula 1 below, a hydrate thereof, or a salt thereof.

[Formula 1]

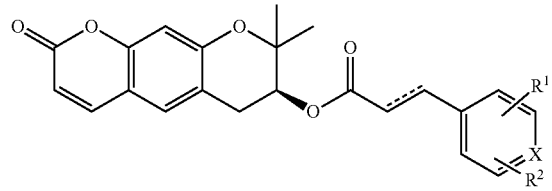

In Formula 1 above,
when ------ is a single bond, X is CH, and $R^1$ and $R^2$ are each different and selected from (C1-C4) alkoxy, hydroxy, or (C1-C4) alkylcarboxy,
when ------ is a double bond, X is N, and $R^1$ and $R^2$ may be the same or each different and are selected from hydrogen, (C1-C4) alkyl, (C1-C4) alkoxy, hydroxy, halo, nitro, cyano, or (C1-C4) alkylcarboxy.

In addition, an example embodiment of the present invention provides a pharmaceutical composition for preventing or treating amyotrophic lateral sclerosis including a compound represented by Formula 2 below, a hydrate thereof, or a salt thereof.

[Formula 2]

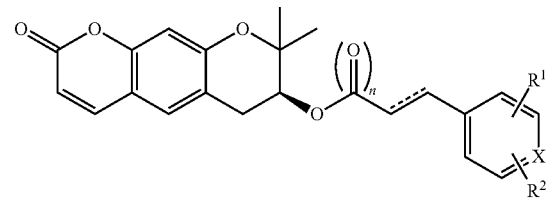

In Formula 2 above,
------ is a single bond or a double bond,
n is an integer from 0 to 1,
X is CH or N, and
$R^1$ and $R^2$ may be the same or each different, and are selected from hydrogen, (C1-C4) alkyl, (C1-C4) alkoxy, hydroxy, halo, nitro, cyano, or (C1-C4) alkylcarboxy.

In addition, an example embodiment of the present invention provides a health functional food composition for preventing or improving amyotrophic lateral sclerosis including the compound represented by Formula 2 above, a hydrate thereof, or a salt thereof.

Advantageous Effects

The present invention relates to a use of a novel compound, for preventing, improving or treating amyotrophic lateral sclerosis (ALS). The present inventors have found that SOD1 aggregation is one of important causes of ALS, and have proposed possibility that WT-SOD1 aggregation, caused by suppressing regulation of intracellular stress or TDP-43, may be a cause of sALS. In addition, the present inventors have discovered novel compound PRG-A-01 (SLC-B036) as the SOD1 aggregation and misfolding inhibitor. The compound exhibited a protective effect against muscle weakness and movement disorder in an ALS mouse model. According to result of a histological analysis, intraspinal nerves were maintained by PRG-A-01 (SLC-B036) treatment. In addition, the present inventors have obtained a candidate compound (PRG-A-04) which may be a more optimized drug. Consequently, the compound of the present invention may be usefully employed in developing a therapeutic agent for the ALS.

BRIEF DESCRIPTIONS OF THE DRAWINGS

FIG. 1 is a diagram illustrating results that mutant SOD1 promotes wild type (WT; normal type)-SOD1 aggregation. A. The images illustrate that mutant SOD1s induce the WT-SOD1 aggregation. B. The images illustrate that mutant SOD1s promote SOD1 aggregation in vitro studies. C. The images illustrate that ER-stress induces the WT-SOD1 aggregation. D. The images illustrate that hypoxic conditions promote the SOD1 aggregation and misfolding.

FIG. 2 shows (A) a diagram illustrating results that mutant SOD1 promotes WT-SOD1 aggregation, and (B) a diagram illustrating results that hypoxic conditions and Zn/Cu ion imbalance induce WT-SOD1 aggregation.

FIG. 3 is a diagram illustrating results of compound inhibitor screening against misfolded SOD1 aggregation. A. A representative graph for compounds screening is illustrated. Negative control (−; red line) was reacted without mutant SOD1, and positive control (+; blue line) was reacted with mutant SOD1 without compound. B. The images illustrate that PRG-A-01 inhibits SOD1 aggregation. C. The images illustrate that PRG-A-01 shows a mutant SOD1 aggregation blocking effect according to doses.

FIG. 4 is a diagram illustrating results of compound inhibitor screening against misfolded SOD1 aggregation. A. A schematic diagram of an ELISA system for screening compounds is illustrated. B. Effects of the compounds on SOD1 expression are illustrated. C. The images illustrate results of testing effects of the compounds on SOD1 aggregation using native gel analysis. D. A chemical structure of PRG-A-01 is illustrated. E. The image illustrates that PRG-A-01 is not cytotoxic.

FIG. 5 is a diagram illustrating results that PRG-A-01 blocks SOD1 aggregation and misfolding. A. The images illustrate that SOD1 aggregation induced by TDP-43 overexpression is inhibited by PRG-A-01 treatment. B. The images illustrate that the SOD1 aggregation induced through the TDP-43 overexpression is reduced by PRG-A-01. C. The images illustrate that the PRG-A-01 blocks multimer formation of SOD1. D. The images illustrate that PRG-A-01 reduces misfolding formation of SOD1. E. Misfolded SOD1 inhibitory effects according to doses of PRG-A-01 are illustrated. F. The image illustrates that PRG-A-01 inhibits misfolding of mutant SOD1.

FIG. 6 is a diagram illustrating that PRG-A-01 blocks SOD1 aggregation and misfolding. A. The images illustrate that TDP-43 overexpression induces WT-SOD1 aggregation. B. The images illustrate that mutant SOD1 affects intracellular localization of TDP43. C. The images illustrate that PRG-A-01 blocks SOD1 aggregation induced by hypoxic stress.

FIG. 7 is a diagram illustrating an in vivo effect of PRG-A-01 in an ALS mouse model. A. A schematic diagram of a PRG-A-01 administration experiment is illustrated. B. Results of grip strength measurement in the ALS mouse model (PRG-A-01 administration from 12 weeks of age) are illustrated. C. Snapshots of mice within video file are illustrated. D. The images show results of histological analysis of spinal cord of SOD1$^{G93A\text{-}Tg}$ mice. E. A simple schematic diagram of mechanism of action of PRG-A-01 is illustrated.

FIG. 8 is a diagram illustrating in vivo effects of PRG-A-01. A and B. Results of measuring grip strength of forelimbs in male (A) and female (B) SOD1$^{G93A\text{-}Tg}$ ALS model mice are illustrated. C. A schematic diagram of behavioral experiment is illustrated. D. Kaplan-Meier survival curves of SOD1$^{G93A\text{-}Tg}$ ALS model mice are illustrated. E. Results of . . . pharmacokinetics (PK) analysis of PRG-A-01 are illustrated.

FIG. 9 is a diagram illustrating optimization results of PRG-A-01. A and B. Results of measurement of cytotoxicity through MTT assay are illustrated. C. Results of native gel analysis for SOD1 aggregation are illustrated. D. Results of IF staining of SOD are illustrated. E. A chemical structure of PRG-A-04, a candidate compound for ALS treatment, is illustrated.

FIG. 10 is a diagram illustrating pharmacokinetic analysis results of PRG-A-02 (A), PRG-A-03 (B), and PRG-A-04 (C).

FIG. 11 is a diagram illustrating effects of PRG-A compounds in ALS model mice. A. Snapshots of mice are illustrated. B. Excellent effects of PRG-A-04 are shown. C. Kaplan-Meier survival curve results of PRG-A-01, PRG-A-02, and PRG-A-03 are illustrated.

BEST MODE

The present inventors determined that blocking of propagation of SOD1 protein or interaction between WT-SOD1 and mutated/misfolded SOD1 might be a therapeutic agent targeting ALS and completed the present invention.

An example embodiment of the present invention provides a compound represented by Formula 1 below, a hydrate thereof, or a salt thereof.

[Formula 1]

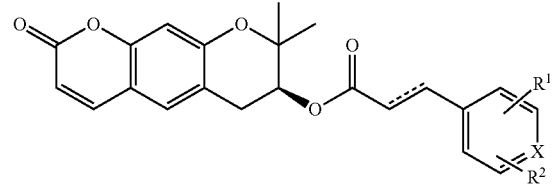

In Formula 1 above,
when ≈≈≈≈≈ is a single bond, X is CH, and $R^1$ and $R^2$ are each different and are selected from (C1-C4) alkoxy, hydroxy, or (C1-C4) alkylcarboxy, and
when ≈≈≈≈≈ is a double bond, X is N, $R^1$ and $R^2$ may be the same or each different, and are selected from hydrogen, (C1-C4) alkyl, (C1-C4) alkoxy, hydroxy, halo, nitro, cyano, or (C1-C4) alkylcarboxy.

Preferably, when ≈≈≈≈≈ is the single bond, X is CH, and $R^1$ and $R^2$ are each different and are selected from (C1-C4) alkoxy, hydroxy, or (C1-C4) alkylcarboxy, and when ≈≈≈≈≈ is the double bond, X is N, and each of $R^1$ and $R^2$ may be hydrogen, but the compound is not limited thereto.

More preferably, the compound may be selected from the group consisting of(S)-8,8-dimethyl-2-oxo-7,8-dihydro-2H,6H-pyrano[3,2-g]chromen-7-yl 3-(4-hydroxy-3-methoxyphenyl) propanoate (SNU-C4), (S)-8,8-dimethyl-2-oxo-7,8-dihydro-2H,6H-pyrano[3,2-g]chromen-7-yl (E)-3-(pyridin-4-yl) acrylate (SNU-C9), and(S)-8,8-dimethyl-2-oxo-7,8- dihydro-2H,6H-pyrano[3,2-g]chromen-7-yl 3-(4-acetoxy-3-methoxyphenyl) propanoate (SNU-C15), but is not limited thereto.

In addition, an example embodiment of the present invention provides a pharmaceutical composition for preventing or treating the ALS including a compound illustrated by Formula 2 below, a hydrate thereof, or a salt thereof.

[Formula 2]

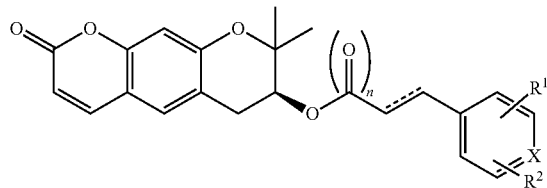

In Formula 2 above,

------ is a single bond or a double bond, n is an integer from 0 to 1,

X is CH or N, and $R^1$ and $R^2$ may be the same or each different, and are selected from hydrogen, (C1-C4) alkyl, (C1-C4) alkoxy, hydroxy, halo, nitro, cyano, or (C1-C4) alkylcarboxy.

Preferably, when ------ is the single bond, n is 1, X is CH, and $R^1$ and $R^2$ may be the same or each different and may be selected from (C1-C4) alkoxy, hydroxy, or (C1-C4) alkylcarboxy, but the compound is not limited thereto.

Preferably, when ------ is the double bond, n is an integer from 0 to 1, X is CH or N, and $R^1$ and $R^2$ may be the same or each different and may be selected from hydrogen, (C1-C4) alkoxy, hydroxy, halo, nitro, or (C1-C4) alkylcarboxy, but the compound is not limited thereto.

More preferably, the compound may be selected from the group consisting of (S)-8,8-dimethyl-2-oxo-7,8-dihydro-2H,6H-pyrano[3,2-g]chromen-7-yl (E)-3-(4-hydroxy-3-methoxyphenyl) acrylate (PRG-A-01; SLC-B036), (S,E)-7-((3-(4-hydroxy-3-methoxyphenyl) allyl)oxy)-8,8-dimethyl-7,8-dihydro-2H,6H-pyrano[3,2-g]chromen-2-one (PRG-A-02), (S)-8,8-dimethyl-2-oxo-7,8-dihydro-2H,6H-pyrano[3,2-g]chromen-7-yl 3-(4-hydroxy-3-methoxyphenyl) propanoate (SNU-C4), (S)-8,8-dimethyl-2-oxo-7,8-dihydro-2H,6H-pyrano[3,2-g]chromen-7-yl (E)-3-(3,4-dimethoxyphenyl) acrylate (SNU-C5), (S)-8,8-dimethyl-2-oxo-7,8-dihydro-2H,6H-pyrano[3,2-g]chromen-7-yl 3-(3,4-dimethoxyphenyl) propanoate (SNU-C7), (S)-8,8-dimethyl-2-oxo-7,8-dihydro-2H,6H-pyrano[3,2-g]chromen-7-yl (E)-3-(pyridin-4-yl) acrylate (SNU-C9), (S)-8,8-dimethyl-2-oxo-7,8-dihydro-2H,6H-pyrano[3,2-g]chromen-7-yl (E)-3-(3-hydroxyphenyl) acrylate (SNU-C10), (S)-8,8-dimethyl-2-oxo-7,8-dihydro-2H,6H-pyrano[3,2-g]chromen-7-yl (E)-3-(4-fluorophenyl) acrylate (SNU-C11; PRG-A-03), (S,E)-7-((3-(4-fluorophenyl) allyl)oxy)-8,8-dimethyl-7,8-dihydro-2H,6H-pyrano[3,2-g]chromen-2-one (SNU-C13), (S)-8,8-dimethyl-2-oxo-7,8-dihydro-2H,6H-pyrano[3,2-g]chromen-7-yl (E)-3-(3-acetoxyphenyl) acrylate (SNU-C14), (S)-8,8-dimethyl-2-oxo-7,8-dihydro-2H,6H-pyrano[3,2-g]chromen-7-yl 3-(4-acetoxy-3-methoxyphenyl) propanoate (SNU-C15), (S)-8,8-dimethyl-2-oxo-7,8-dihydro-2H,6H-pyrano[3,2-g]chromen-7-yl (E)-3-(4-acetoxy-3-methoxyphenyl) acrylate (SNU-C17), (S)-8,8-dimethyl-2-oxo-7,8-dihydro-2H,6H-pyrano[3,2-g]chromen-7-yl (E)-3-(3,4-difluorophenyl) acrylate (SNU-C18), and (S,E)-7-((3-(3-methoxy-4-nitrophenyl) allyl)oxy)-8,8-dimethyl-7,8-dihydro-2H,6H-pyrano[3,2-g]chromen-2-one (PRG-A-04), but is not limited thereto.

More preferably, the pharmaceutical composition may inhibit aggregation and misfolding of superoxide dismutase 1 (SOD1).

The pharmaceutical composition of the present disclosure may be prepared using pharmaceutically suitable and physiologically acceptable adjuvants in addition to an active ingredient, and an excipient, a disintegrant, a sweetener, a binder, a coating agent, a blowing agent, a lubricant, a glidant agent, a flavoring agent, or a solubilizer may be used as the adjuvant. The pharmaceutical composition of the present disclosure may be preferably formulated into a pharmaceutical composition including one or more pharmaceutically acceptable carriers in addition to the active ingredient for administration. In the composition prepared as a liquid solution, the acceptable pharmaceutical carriers are sterile and biocompatible, and saline, sterile water, Ringer's solution, buffered saline, albumin injection, dextrose solution, maltodextrin solution, glycerol, ethanol, or a mixture of one or more of them may be used as the carrier. Other conventional additives such as antioxidants, buffers, and bacteriostats may be added as needed. In addition, diluents, dispersants, surfactants, binders, and lubricants may be additionally added to formulate an injectable formulation such as an aqueous solution, suspension, and emulsion, pills, capsules, granules, or tablets.

A pharmaceutical formulation form of the pharmaceutical composition of the present disclosure may be granules, powders, coated tablets, tablets, capsules, suppositories, syrups, juices, suspensions, emulsions, drops or injectable solutions, and sustained-release formulations of active compound. The pharmaceutical composition of the present disclosure may be administered in a conventional manner via the intravenous, intraarterial, intraperitoneal, intramuscular, intraarterial, intraperitoneal, intrasternal, transdermal, intranasal, inhalational, topical, rectal, oral, intraocular or intradermal route. An effective amount of the active ingredient of the pharmaceutical composition of the present disclosure means an amount required for preventing or treating a disease. Therefore, it may be adjusted according to various factors, including the type of disease, severity of the disease, the type and content of the active ingredient and other ingredients included in the composition, the type of formulation, and age, weight, general health condition, sex, and diet of the patient, administration time, administration route, and secretion rate, duration of treatment, and concomitant drugs of the composition. Although not limited thereto, for example, in the case of adults, when administered once or several times a day, the composition of the present disclosure may be administered at a dose of 0.01 ng/kg-10 g/kg.

In addition, an example embodiment of the present invention provides a health functional food composition for preventing or improving amyotrophic lateral sclerosis including the compound represented by Formula 2 below, a hydrate thereof, or a salt thereof.

[Formula 2]

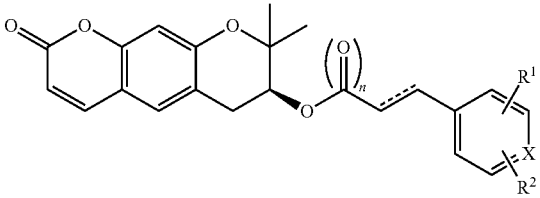

In Formula 2 above,

------ is a single bond or a double bond, n is an integer from 0 to 1,

X is CH or N, and $R^1$ and $R^2$ may be the same or each different, are selected from hydrogen, (C1-C4) alkyl, (C1-C4) alkoxy, hydroxy, halo, nitro, cyano, or (C1-C4) alkylcarboxy.

Preferably, when ------ is the single bond, n is 1, X is CH, and $R^1$ and $R^2$ may be the same or each different and may be selected from (C1-C4) alkoxy, hydroxy, or (C1-C4) alkylcarboxy, but the compound is not limited thereto.

Preferably, when ------ is a double bond, n is an integer from 0 to 1, X is CH or N, and $R^1$ and $R^2$ may be the same or each different and may be selected from hydrogen, (C1-$C_4$) alkoxy, hydroxy, halo, nitro, or (C1-C4) alkylcarboxy, but the compound is not limited thereto.

More preferably, the compound may be selected from the group consisting of(S)-8,8-dimethyl-2-oxo-7,8-dihydro-2H, 6H-pyrano[3,2-g]chromen-7-yl (E)-3-(4-hydroxy-3-methoxyphenyl) acrylate (PRG-A-01; SLC-B036), (S,E)-7-((3-(4-hydroxy-3-methoxyphenyl) allyl)oxy)-8,8-dimethyl-7,8-dihydro-2H,6H-pyrano[3,2-g]chromen-2-one (PRG-A-02), (S)-8,8-dimethyl-2-oxo-7,8-dihydro-2H,6H-pyrano[3,2-g]chromen-7-yl 3-(4-hydroxy-3-methoxyphenyl) propanoate (SNU-C4), (S)-8,8-dimethyl-2-oxo-7,8-dihydro-2H,6H-pyrano[3,2-g]chromen-7-yl (E)-3-(3,4-dimethoxyphenyl) acrylate (SNU-C5), (S)-8,8-dimethyl-2-oxo-7,8-dihydro-2H,6H-pyrano[3,2-g]chromen-7-yl 3-(3,4-dimethoxyphenyl) propanoate (SNU-C7), (S)-8,8-dimethyl-2-oxo-7,8-dihydro-2H,6H-pyrano[3,2-g]chromen-7-yl (E)-3-(pyridin-4-yl) acrylate (SNU-C9), (S)-8,8-dimethyl-2-oxo-7,8-dihydro-2H,6H-pyrano[3,2-g]chromen-7-yl (E)-3-(3-hydroxyphenyl) acrylate (SNU-C10), (S)-8,8-dimethyl-2-oxo-7,8-dihydro-2H,6H-pyrano[3,2-g]chromen-7-yl (E)-3-(4-fluorophenyl) acrylate (SNU-C11; PRG-A-03), (S,E)-7-((3-(4-fluorophenyl) allyl)oxy)-8,8-dimethyl-7,8-dihydro-2H, 6H-pyrano[3,2-g]chromen-2-one (SNU-C13), (S)-8,8-dimethyl-2-oxo-7,8-dihydro-2H,6H-pyrano[3,2-g]chromen-7-yl (E)-3-(3-acetoxyphenyl) acrylate (SNU-C14), (S)-8,8-dimethyl-2-oxo-7,8-dihydro-2H,6H-pyrano[3,2-g]chromen-7-yl 3-(4-acetoxy-3-methoxyphenyl) propanoate (SNU-C15), (S)-8,8-dimethyl-2-oxo-7,8-dihydro-2H,6H-pyrano[3,2-g]chromen-7-yl (E)-3-(4-acetoxy-3-methoxyphenyl) acrylate (SNU-C17), (S)-8,8-dimethyl-2-oxo-7,8-dihydro-2H,6H-pyrano[3,2-g]chromen-7-yl (E)-3-(3,4-difluorophenyl) acrylate (SNU-C18), and (S,E)-7-((3-(3-methoxy-4-nitrophenyl) allyl)oxy)-8,8-dimethyl-7,8-dihydro-2H,6H-pyrano[3,2-g]chromen-2-one (PRG-A-04), but is not limited thereto.

The health functional food composition of the present disclosure may further include one or more additives selected from the group consisting of organic acid, phosphate, antioxidant, lactose casein, dextrin, glucose, sugar, and sorbitol. The organic acid may be, but is not limited thereto, citric acid, fumaric acid, adipic acid, lactic acid, or malic acid, the phosphate may be, but is not limited thereto, sodium phosphate, potassium phosphate, acid pyrophosphate, or polyphosphate, and the antioxidant may be a natural antioxidant such as, but not limited thereto, polyphenols, catechins, alpha-tocopherol, rosemary extract, licorice extract, chitosan, tannic acid, or phytic acid.

In another specific embodiment of the present invention, the health functional food may include, in addition to the active ingredient, various nutrients, vitamins, minerals (electrolytes), flavoring agents such as synthetic flavoring agents and natural flavoring agents, coloring agents and thickening agents (cheese, chocolate, etc.), pectic acid and its salts, alginic acid and its salts, organic acids, protective colloidal thickeners, pH adjusters, stabilizers, preservatives, glycerin, alcohols, and carbonation agents used in carbonated beverages. In addition, a food composition according to an example embodiment of the present invention may include fruit flesh for making of natural fruit juice, fruit juice beverage, and vegetable beverage.

According to an example embodiment of the present invention, a form of the health functional food is not limited thereto, but may be in the form of a solid, powder, granule, tablet, capsule, liquid, or beverage.

In addition, the health functional food is not limited thereto, but may be used in making of foods such as confectionery, sugars, ice cream products, dairy products, meat products, fish meat products, tofu or jelly, edible oils and fats, noodles, teas, beverages, special nutritional foods, health supplements, seasoned foods, ice, ginseng products, pickled kimchi food, raisins, fruits, vegetables, dried fruits or vegetables, cut products of fruits or vegetables, fruit juice, vegetable juice, mixed juices thereof, chips, noodles, processed livestock food, processed seafood, milk processed food, fermented milk food, pulse food, grain food, microbial fermented food, confectionery and bread, seasonings, processed meat, acidic beverage, licorice, . . . and herbs.

MODES FOR CARRYING OUT INVENTION

Hereinafter, examples will be described in detail to help understanding of the present invention. However, the examples below are provided to more completely explain the present invention to a person skilled in the art, and are merely illustrative of contents of the present invention, so that scope of the present invention is not limited to the examples below.

The experimental example below is to provide an experimental example commonly applied to each example according to the present invention.

EXPERIMENTAL EXAMPLE

1. Mouse

An experiment was performed in a facility approved by the Association for Laboratory Animal Care Assessment and Accreditation in accordance with the animal policy approved by Busan National University. B6SJL-Tg (SOD1$^{G93A}$) mice were purchased from Jackson Laboratory (Stock No: 002726). All mice were maintained under temperature and light-controlled conditions (20~23° C., light-dark cycle 12 hr-12 hr) and were provided with sterile food and water.

2. In Vivo Drug Treatment and Histological Analysis

Vehicle (DMSO) and SLC-B036 (10 mg/kg, 20 mg/kg) were administered to 12-week-old or 14-week-old SOD1$^{G93A}$ mice via intraperitoneal injection twice weekly for 6 weeks. Control mice were treated under the same conditions. For histological analysis, mice were sacrificed at 18 weeks. After dissection of mice, spinal cord was fixed with 4% paraformaldehyde for 48 hours according to basic tissue processing procedures, and embedded in a paraffin block. An embedded tissue (cervical region of the spinal cord) was cut into 5 μm with a Leica microtome, and transferred to an adhesive-coated slide (Marienfeld laboratory glassware, Germany). After deparaffinization and rehydration, the slide was stained with hematoxylin and eosin to determine the number of spinal nerves.

3. Exercise Performance Measurement

For behavioral experiment, grip strength was checked every 2 weeks using a grip strength meter. The mice were allowed to grasp a tension bar with their forelimbs, and then their tails were slowly pulled until they released the bar. To observe motility, respiration, and quadriplegia of the mice, image analysis was performed at the end of administration (18-20 weeks).

4. Cell Culture and Reagent

HEK293 cells were purchased from American Type Culture Collection (ATCC, Manassas, VA, USA) and maintained at 37° C. and 5% $CO_2$ in DMEM liquid medium including 10% fetal bovine serum and 1% penicillin-streptomycin. SK—N—SH cells were purchased from Korean Cell Line Bank (KCLB, Seoul, South Korea) and maintained in MEM medium including 10% fetal bovine serum, 1% antibiotic, 25 mM HEPES, and 300 mg/L L-Glu. Human fibroblasts (9 years old female) were purchased from Coriell Cell Repositories (New Jersey, USA) and maintained in EMEM including 15% FBS, 2 mM Glutamine, and 26 mM HEPES without antibiotics. Thapsigargin (ER calcium scavenger: CAS 67526-95-8) was purchased from Calbiochem (Darmstadt, Germany). $CoCl_2$ (hypoxia-inducer: C8661) was purchased from Sigma Aldrich (St, Louis, Mo, USA).

5. Compound Screening

For compound screening, the present inventors applied an ELISA assay system. To select a binding inhibitor between WT-SOD1 and mutant SOD1, the present inventors used 0.5% paraformaldehyde (PFA) to fix WT-SOD1 recombinant protein on a 96-well plate. The plate was dried, washed with phosphate-buffered saline (PBS), and reacted with the compounds at a final concentration of 50 μM, and then mutant SOD1-GST (A4V, G37R, G85R, G93A) proteins were added. After 2 hours of reaction, the 96-well plate was washed with PBS and blocked with 3% skim milk to prevent non specific reaction. The plate was reacted with anti-GST antibody (diluted at 1:10,000) for 1 hour, and then reacted with anti-mouse IgG-HRP (diluted at 1:50,000) for 1 hour. After washing twice, the plate was reacted with a 3,3',5,5'-tetramethylbenzidine (TMB) solution (Calbiochem) for 30 minutes and a stop solution (1N $H_2SO_4$) for 30 minutes. Finally, the present inventors analyzed values using an ELISA reader (450 nm absorbance). Negative control (−; red line) was reacted without mutant SOD1, and positive control (+; blue line) was reacted with mutant SOD1 without the compounds.

6. Recombinant Protein

To prepare recombinant proteins, human SOD1 (WT, A4V, G37R, G85R, G93A) was added to EcoRI and HindIII sites of pGEX-TEV vector, an improved vector made by adding a TEV protease cleavage site to pGEX-4T1 (Invitrogen). The recombinant proteins were expressed as GST-fusion proteins in *Escherichia coli* (*E. coli*) strain BL21 (DE3). The proteins were purified by glutathione-affinity chromatography.

7. Western Blot Analysis

Using RIPA buffer (50 mM Tris-Cl, pH 7.5, 150 mM NaCl, 1% NP-40, 0.1% SDS and 10% sodium deoxycholate) for SDS-PAGE and lysis buffer (50 mM Tris-Cl, pH 7.5, 150 mM NaCl, 0.3% NP-40) for Native-PAGE, proteins were extracted from cells. Samples were separated by the SDS-PAGE or the Native-PAGE and transferred to PVDF membrane. Blotted membrane was blocked with TBST buffer including 3% skim milk for 1 hour, and reacted with specific antibodies. The reacted antibodies were detected by ECL and X-ray film exposure. Antibodies used in the present disclosure are as follows: pan-SOD1 (GTX100554) was purchased from Genetex (California, USA). Misfolded SOD1-specific antibody (B8H10) was purchased from MediMabs (Montreal, Canada). Actin (sc-1616), GST (sc-138), and GFP (Green fluorescent protein; sc-8036) were purchased from Santa Cruz biotechnology (Santa Cruz, CA, USA). TDP-43 antibody (10782-2-AP) was purchased from Proteintech (Rosemont, IL, USA). Anti-FLAG (Sigma; F3165) was purchased from Sigma Aldrich (St, Louis, Mo, USA), and HRP-conjugated goat anti-mouse, goat anti-rabbit, and mouse anti-goat antibodies (Pierce, Thermo Fisher Scientific, Inc., Rockford, IL, USA) were used as secondary antibodies.

8. Dot Blot Analysis

To detect misfolded SOD1 expression, cells transfected with SOD1 vector were treated with the compounds for 24 hours. After reaction, the cells were lysed with a lysis buffer without surfactant, and then cell lysate was fixed on a nitrocellulose membrane using a Bio-Dot SF Microfiltration apparatus (Bio-Rad Laboratories, Hercules, CA). In the case of peptide reaction, SOD1 recombinant proteins were reacted with the compounds for 1 hour, and then samples were loaded onto membrane. Each membrane was washed with TBS and blocked with 3% skim milk to prevent non specific reaction. After blocking, the membrane was reacted with the misfolded SOD1 or Actin antibody (1:8,000 in TBST including 1% skim milk) for 30 minutes, and then with a secondary antibody (goat anti-mouse IgG-horseradish peroxidase, 1:50,000 in 1% skim milk blocking buffer) for 30 minutes. Antibodies reacted to proteins were detected by ECL and X-ray film exposure. Actin was used as a loading control.

9. Immunofluorescence Staining

Cells on coverslip were washed with PBS, fixed with 4% PFA at room temperature for 30 minutes, and then infiltrated with 0.1% Triton X-100/PBS for 10 minutes. The cells were treated with blocking solution (anti-Human Antibody 1:500 dilution in PBS) for 1 hour, and then cells were reacted with anti-pan SOD1 (1:400 dilution), misfolded SOD1 (B8H10; 1:200 dilution in blocking solution) at 4° C. overnight. Finally, the cells were reacted with FITC and rhodamine-conjugated secondary antibody at 4° C. for 6 hours. Nuclei were stained with 4,6-diamidino-2-phenylindole (DAPI), and endoplasmic reticula (ERs) were stained with ER-Tracker Red dye for 10 minutes. The cells were washed 3 times with PBS, and then coverslips were mounted with mounting solution [H-5501; Vector Laboratories (Burlingame, CA, USA)] and analyzed by fluorescence microscopy (Zeiss).

10. Vector Transfection

GFP-SOD1 (WT, G85R, G93A), non-tagged SOD1 (WT, A4V, G37R, G85R, G93A) and tdTomato-TDP43 expression vectors were purchased from Addgene (Cambridge, MA, USA). Transfection was performed using Jet-PEI reagent (JetPEI; Polyplus transfection, New York, NY, USA) according to the manufacturer's protocol. Briefly, vectors were mixed with JetPEI reagent in 150 mM NaCl buffer, and then mixture was reacted for 15 minutes. The mixture was added to cells in serum-free medium and reacted for 4 hours. After reaction, the cells were replaced with a culture medium supplemented with 10% FBS.

11. Cell Viability Measurement

To check cells viability, the cells were reacted with 0.5 mg/ml MTT solution (475989; Merck, Darmstadt, Germany) at 37° C. for 4 hours. After removing residual solution and washing with PBS, precipitate was dissolved in 200 µl DMSO, and quantified by measuring absorbance at 540 nm.

Example

The present inventors transfected (transfection) mutant SOD1 into cells expressing GFP-WT-SOD1. In cytoplasm, WT-SOD1 was aggregated by mutant SOD1 regardless of mutation type (FIGS. 1A and 2). In addition, as a result of observing interaction between WT-SOD1 protein and mutant recombinant SOD1 protein through Native-PAGE, it was found that WT-SOD1 was aggregated by mutant SOD1 treatment (FIG. 1B; G93A-reaction did not move into gel due to too large aggregation). Next, the present inventors confirmed WT-SOD1 aggregation by cellular stress. Since ALS is a disease specific to motor neurons and $Ca^{2+}$ is important not only for neuronal function but also for muscle contraction, the present inventors tested effect of Thapsigargin (ER calcium scavenger) on SOD1 aggregation. Treatment with the Thapsigarigin certainly promoted the WT-SOD1 aggregation as well as mutant SOD1s (FIG. 1C). In addition, the present inventors confirmed SOD1 aggregation and increase of misfolded SOD1 by $CoCl_2$ (hypoxia-inducing agent) (FIG. 1D; red signal increased in $CoCl_2$-treated cells). On the other hand, SOD1 is also known to use Cu/Zn ions for enzymatic activity. Accordingly, the present inventors confirmed effect of conditions lacking Cu/Zn ions on the SOD1 aggregation in the SOD1 aggregation. As illustrated in FIG. 2, TPEN (Zn2+ chelator) and ATN-224 (Cu2+ chelator) induced the WT-SOD1 aggregation. The results support that SOD1 may be converted to an aggregated or misfolded form by cellular stress conditions without genetic mutation, and that misfolding of SOD1 may also be cause of sporadic ALS.

If the SOD1 aggregation is cause of ALS, blocking the SOD1 aggregation is one of possible strategies for drug development. In fact, neutralizing antibodies against the misfolded SOD1 exhibited a good effect in an SOD1 animal model. To prove this, the present inventors constructed compounds screening system based on ELISA. To discover a selective binding inhibitor for binding of the misfolded SOD1 and the WT-SOD1, the present inventors fixed the WT-SOD1 on ELISA plate and reacted with GST-tagged mutant SOD1s (A4V, G37R, G85R, G93A) (FIG. 4A). Previously, the present inventors performed a similar screening and obtained compound library. Using the compound library, the present inventors measured inhibitory effect of each compound (FIG. 3A). Since SOD1 removes superoxide after dimer formation, the present inventors removed too strong binding inhibitors (such as SLC-B035) and selected compounds specific for mutation (such as SLC-B040 or B036) (FIG. 3A). The compounds did not affect SOD1 expression (FIG. 4B). Next, the present inventors confirmed effect of the selected compounds on SOD1 aggregation through native gel analysis (FIG. 4C), and selected SLC-B036 as a first hit compound (FIG. 4D). Indeed, the compound was capable of blocking mutant SOD1 aggregation in a dose-dependent manner (FIGS. 3B and 3C). Moreover, the compound did not exhibit cytotoxic effect in normal human fibroblasts (FIG. 4E). Thereafter, SLC-B036 was renamed PRG-A-01.

Next, the present inventors confirmed effect of compounds on the WT-SOD1 aggregation. Recently, it has been reported that overexpression or deficiency of TDP-43 may induce the misfolding of SOD1. The present inventors might also confirm WT-SOD1 aggregation by TDP-43 overexpression through immunofluorescence analysis (FIGS. 5A and 6A). In addition, SOD1 mutations increased cytoplasmic (F2 fraction) and insoluble (F4 fraction) TDP43 protein, suggesting that TDP-43 and SOD1 were associated with pathogenesis of ALS (FIG. 6B). PRG-A-01 treatment might reduce the SOD1 aggregation as well as TDP-43 (FIG. 5A). In addition, in the results of the native gel analysis, it was confirmed that the SOD1 aggregation and TDP43 aggregation was decreased by the PRG-A-01 treatment (FIG. 5B). As a result of a cross-linking experiment using glutaraldehyde, inhibitory effect of the PRG-A-01 was more evident. Bands corresponding to multimer size of SOD1 and TDP-43 formed through cross-linking were weakened by the PRG-A-01 treatment (FIG. 5C). To find out if the PRG-A-01 might block misfolding formation of SOD1, the present inventors performed dot blot analysis. Cell lysates transfected with WT- or mutant SOD1 were transferred to an aspirator and reacted with antibodies specific for the misfolded SOD1. In compound-treated cells, band intensity clearly decreased (FIG. 5D). In addition, the present inventors might confirm a dose-dependent decrease in misfolded SOD1 by the PRG-A-01 treatment in G93A-transfected cell lysates (FIG. 5E). When the PRG-A-01 and SOD1-G93A were reacted, antibody specific for misfolding did not recognize mutant SOD1 (FIG. 5F), indicating that the PRG-A-01 changed protein structure and the misfolded SOD1 might be corrected in form of WT-SOD1. In addition, since the present inventors found that hypoxic stress might induce the misfolding of SOD1, effect of PRG-A-01 under hypoxic conditions was confirmed. Signal transduction of misfolded SOD1 induced with $CoCl_2$ was reduced by the PRG-A-01 treatment (FIG. 6C), indicating that the the PRG-A-01 inhibited induction of disease by the misfolding of SOD1.

To confirm the in vivo effect of the compounds, the present inventors administered the PRG-A-01 i.p twice a week to SOD1$^{G93A\text{-}Tg}$ mice model (FIG. 7A). The PRG-A-01 treatment might slow decrease in muscle strength. Compared to wild-type mice, PRG-A-01 treated mice maintained about 70% muscle strength (FIG. 7B). In contrast, vehicle-treated mice exhibited less than 40% muscle strength (FIG. 7B). In addition, despite late treatment of PRG-A-01 (starting at 14 weeks of age), it had a good effect on muscle function (FIGS. 8A and 8B). In addition, the PRG-A-01 illustrated a dose-dependent effect, and administration of 20 mg/kg was more effective than administration of 10 mg/kg (FIGS. 8A and 8B). Behavioral observations illustrated very impressive results, despite 14-week-old dosing (phenotype started at 14-weeks of age), the PRG-A-01 treated mice still had motor capacity at 17-weeks of age (FIGS. 7C and 8C). The effect might be observed irrespective of gender. In contrast, the vehicle-treated mice were unable to stand up and exhibited problems with autogenous breathing. As a result of histological analysis, viability of cervical spinal nerves was high in the PRG-A-01 treated mice (FIG. 7D). Conversely, most nerves disappeared in the vehicle-treated mice spinal cord (FIG. 7D). However, the PRG-A-01 only extended lifespan by 10 days (FIG. 8D). In this regard, the present invention predict that half-life of the PRG-A-01 may be very short in in vivo systems. Indeed, since PRG-A-01 rapidly disappeared within 30 minutes in body, it disappeared in blood too quickly to obtain pharmacokinetic (PK) data (FIG. 8E).

To overcome rapid degradation, the present inventors prepared PRG-A-01 related derivatives and confirmed effects of these compounds (Table 1). Among newly synthesized compounds, PRG-A-02, PRG-A-03 and PRG-A-04 illustrated similar or superior effects to the PRG-A-01. Indeed, the compounds did not exhibit cytotoxicity in neurons (FIG. 9A) and normal fibroblasts (FIG. 9B). In addition, the present inventors confirmed effect of the compounds on the SOD1 aggregation through non-SDS-PAGE gel (FIG. 9C) and IF analysis (FIG. 9D). According to cell-based assays and in vitro assays of the present invention, three compounds (PRG-A-02, PRG-A-03 and PRG-A-04) were selected and analyzed for PK. Since only the PRG-A-04 illustrated an appropriate PK profile (FIG. 10), the present inventors selected the PRG-A-04 as a candidate compound for treatment of ALS.

In in vivo analysis, the present inventors might confirm good effects from PRG-A-02 and PRG-A-03 administration groups as well as PRG-A-04 treatment group (FIGS. 11A and 11B). A more interesting result was that lifespan of ALS model mice increased according to PK profile (FIGS. 11C and 11D). Although the present inventors might not obtain lifespan data of PRG-A-04, it may be predicted that the lifespan will be obviously extended compared to other compounds.

Chemical structures and NMR data of compounds used in the present invention are as follows.

(S,E)-7-((3-(4-hydroxy-3-methoxyphenyl) allyl)oxy)-8,8-dimethyl-7,8-dihydro-2H,6H-pyrano[3,2-g]chromen-2-one (PRG-A-02)

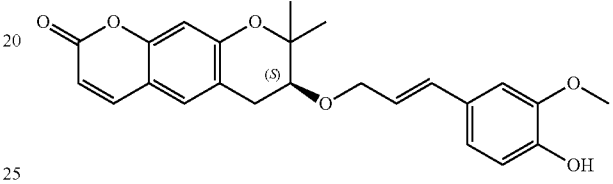

$^1$H NMR: EW15731-164-P1D4 (400 MHZ, CDCl$_3$)

δ 7.58 (d, J=12 Hz, 1H), 7.16 (s, 1H), 6.90-6.86 (m, 3H), 6.78 (s, 1H), 6.51 (d, J=16 Hz, 1H), 6.22 (d, J=8.0 Hz, 1H), 6.14-6.10 (m, 1H), 5.65 (s, 1H), 4.32-4.30 (m, 1H), 4.22-4.20 (m, 1H), 3.91 (s, 3H), 3.61-3.58 (m, 1H), 3.11-3.05 (m, 1H), 3.89-3.87 (m, 1H), 1.43 (s, 3H), 1.36 (s, 3H).

TABLE 1

| No. | MW | Western Blot | Immuno-fluorscence | ELISA | In vivo | Toxicity (MTT) | PK study |
|---|---|---|---|---|---|---|---|
| PRG-A-01 (SLC-B036) | 422.43 | Effect ○ | Effect ○ | Effect ○ | Effect ○ | No toxicity | BA Very low |
| PRG-A-02 | 408.44 | Effect ○ | Effect ○ | Effect ○ | Effect ○ | No toxicity | BA Very Low (0.3%) |
| SNU-C4 | 424.449 | Effect x | Effect x | Effect x | — | No toxicity | — |
| SNU-C5 | 436.46 | Effect x | Effect x | Effect ○ | — | No toxicity | — |
| SNU-C7 | 438.476 | Effect x | Effect x | Effect x | — | No toxicity | — |
| SNU-C9 | 377.396 | Effect ○ | Effect ○ | Effect x | — | No toxicity | — |
| SNU-C10 | 392.407 | Effect ○ | Effect ○ | Effect ○ | — | No toxicity | — |
| PRG-A-03 (SNU-C11) | 394.398 | Effect ○ | Effect ○ | Effect ○ | Effect ○ | No toxicity | BA Very Low (3.7%) |
| SNU-C13 | 380.415 | Effect x | — | — | — | — | — |
| SNU-C14 | 434.444 | Effect ○ | Effect ○ | Effect ○ | — | No toxicity | — |
| SNU-C15 | 466.486 | Effect ○ | Effect ○ | Effect x | — | No toxicity | — |
| SNU-C17 | 464.47 | Effect ○ | Effect ○ | — | — | — | — |
| SNU-C18 | 412.11 | Effect ○ | Effect ○ | — | — | Toxic | — |
| PRG-A-04 (SNU-C19) | 437.15 | Effect ○ | Effect ○ | Effect ○ | Effect ○ | No toxicity | BA = 60.7% |

(S)-8,8-dimethyl-2-oxo-7,8-dihydro-2H,6H-pyrano [3,2-g]chromen-7-yl 3-(4-hydroxy-3-methoxyphenyl) propanoate (Compound 4; SNU-C4)

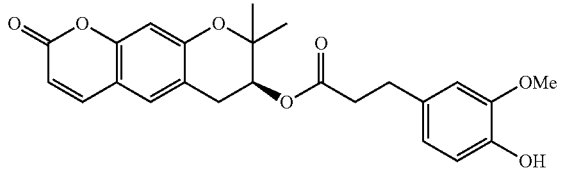 [SMILES: COc1cc(CCC(=O)O[C@H]2Cc3cc4ccc(=O)oc4cc3OC2(C)C)ccc1O]

$^1$H NMR (CDCl$_3$, 400 MHz): δ ppm 7.59 (d, 1H), 7.06 (s, 1H), 6.82-6.73 (m, 2H), 6.64-6.57 (m, 2H), 6.24 (d, J=9.5 Hz, 1H), 5.44 (br.s, 1H), 5.01 (t, J=4.6 Hz, 1H), 3.79 (s, 3H), 3.09 (ddd, J=17.2, 4.7, 1.2 Hz, 1H), 2.85 (app.t, J=7.2 Hz, 2H), 2.70-2.59 (m, 3H), 1.31 (s, 3H), 1.29 (s, 3H).
HRMS: Calcd for C24H2507$^+$ [M+H]+425.1595, found 286.1652.

(S)-8,8-dimethyl-2-oxo-7,8-dihydro-2H,6H-pyrano [3,2-g]chromen-7-yl (E)-3-(3,4-dimethoxyphenyl) acrylate (Compound 5; SNU-C5)

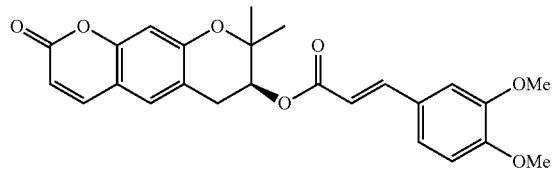 [SMILES: COc1ccc(/C=C/C(=O)O[C@H]2Cc3cc4ccc(=O)oc4cc3OC2(C)C)cc1OC]

$^1$H NMR (CDCl$_3$, 400 MHz): δ ppm 7.67-7.55 (m, 2H), 7.18 (s, 1H), 7.08 (d, J=8.2 Hz, 1H), 7.02 (s, 1H), 6.88-6.81 (m, 2H), 6.28 (d, J=16.0 Hz, 1H), 6.24 (d, J=9.4 Hz, 1H), 5.20 (app.t, J=4.6 Hz, 1H), 3.91 (s, 3H), 3.89 (s, 3H), 3.25 (dd, J=17.3, 4.8 Hz, 1H), 2.94 (dd, J=17.3, 4.5 Hz, 1H), 1.45 (s, 3H), 1.39 (s, 3H).

(S)-8,8-dimethyl-2-oxo-7,8-dihydro-2H,6H-pyrano [3,2-g]chromen-7-yl 3-(3,4-dimethoxyphenyl) propanoate (Compound 7; SNU-C7)

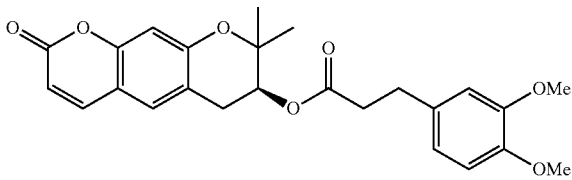 [SMILES: COc1ccc(CCC(=O)O[C@H]2Cc3cc4ccc(=O)oc4cc3OC2(C)C)cc1OC]

$^1$H NMR (CDCl$_3$, 400 MHz): δ ppm 7.59 (d, J=9.6 Hz, 1H), 7.07 (s, 1H), 6.83-6.63 (m, 4H), 6.24 (d, J=9.6 Hz, 1H), 5.03 (app.t, J=4.8 Hz, 1H), 3.84 (s, 3H), 3.80 (s, 3H), 3.11 (dd, J=17.3, 4.6 Hz, 1H), 2.87 (t, J=7.3 Hz, 2H), 2.69 (dd, J=17.2, 4.6 Hz, 1H), 2.63 (app.td, J=7.3, 1.9 Hz, 2H), 1.31 (s, 3H), 1.30 (s, 3H).

(S)-8,8-dimethyl-2-oxo-7,8-dihydro-2H,6H-pyrano [3,2-g]chromen-7-yl (E)-3-(pyridin-4-yl) acrylate (Compound 9; SNU-C9)

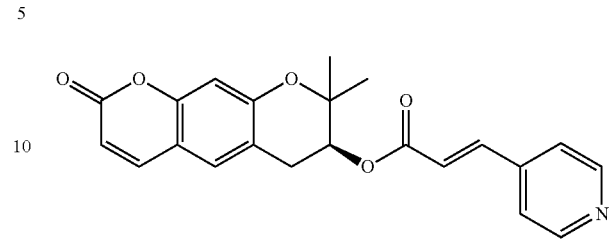

$^1$H NMR (CDCl$_3$, 400 MHz): δ ppm 8.72-8.59 (m, 2H), 7.60 (d, 1H), 7.57 (d, 1H), 7.36-7.30 (m, 2H), 7.18 (s, 1H), 6.83 (s, 1H), 6.58 (d, J=16.0 Hz, 1H), 6.24 (d, J=9.4 Hz, 1H), 5.21 (app.t, J=4.6 Hz, 1H), 3.26 (ddd, J=17.2, 4.8, 1.2 Hz, 1H), 3.00-2.89 (m, 1H), 1.44 (s, 3H), 1.39 (s, 3H).

(S)-8,8-dimethyl-2-oxo-7,8-dihydro-2H,6H-pyrano [3,2-g]chromen-7-yl (E)-3-(3-hydroxyphenyl) acrylate (Compound 10; SNU-C10)

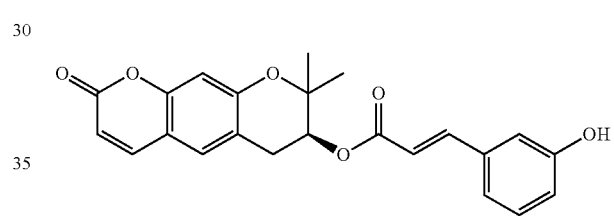

$^1$H NMR (CD$_2$Cl$_2$, 400 MHz): δ ppm 7.64-7.55 (m, 2H), 7.25 (app.t, J=7.9 Hz, 1H), 7.21 (s, 1H), 7.13-7.06 (m, 1H), 7.00-6.95 (m, 1H), 6.86 (ddd, J=8.1, 2.6, 1.0 Hz, 1H), 6.78 (s, 1H), 6.40 (d, J=15.9 Hz, 1H), 6.18 (d, J=9.5 Hz, 1H), 5.18 (app.t, J=4.8 Hz, 1H), 3.25 (ddd, J=17.3, 4.9, 1.2 Hz, 1H), 2.94 (dd, J=17.3, 4.7 Hz, 1H), 1.42 (s, 3H), 1.38 (s, 3H), 1.25 (brs, 1H).

(S)-8,8-dimethyl-2-oxo-7,8-dihydro-2H,6H-pyrano [3,2-g]chromen-7-yl (E)-3-(4-fluorophenyl) acrylate (Compound 11; SNU-C11; PRG-A-03)

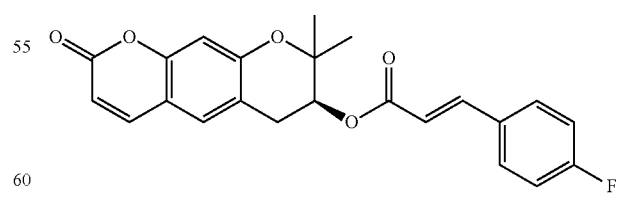

$^1$H NMR (CD$_2$Cl$_2$, 400 MHz): δ ppm 7.66-7.55 (m, 2H), 7.55-7.46 (m, 2H), 7.18 (s, 1H), 7.11-7.01 (m, 2H), 6.76 (s, 1H), 6.35 (d, J=16.0 Hz, 1H), 6.16 (d, J=9.5 Hz, 1H), 5.17 (app.t, J=4.7 Hz, 1H), 3.23 (ddd, J=17.3, 4.8, 1.2 Hz, 1H), 2.92 (dd, J=17.3, 4.7 Hz, 1H), 1.40 (s, 3H), 1.36 (s, 3H).

(S,E)-7-((3-(4-fluorophenyl) allyl)oxy)-8,8-dimethyl-7,8-dihydro-2H,6H-pyrano[3,2-g]chromen-2-one (Compound 13; SNU-C13)

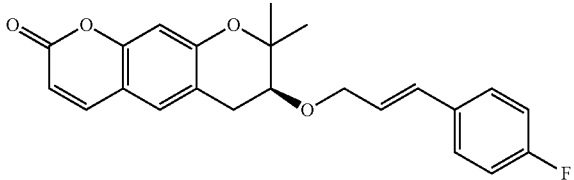 [SMILES: CC1(C)Oc2cc3oc(=O)ccc3cc2C[C@@H]1OC/C=C/c1ccc(F)cc1]

$^1$H NMR (CDCl$_3$, 400 MHZ): δ ppm 7.57 (d, J=9.5 Hz, 1H), 7.38-7.29 (m, 2H), 7.16 (s, 1H), 7.06-6.93 (m, 2H), 6.77 (s, 1H), 6.55 (d, J=15.8 Hz, 1H), 6.25-6.13 (m, 2H), 4.33 (ddd, J=12.8, 5.8, 1.5 Hz, 1H), 4.19 (ddd, J=12.8, 6.3, 1.4 Hz, 1H), 3.58 (dd, J=7.4, 5.0 Hz, 1H), 3.08 (dd, J=16.4, 5.0 Hz, 1H), 2.85 (ddd, J=16.4, 7.4, 1.1 Hz, 1H), 1.42 (s, 3H), 1.35 (s, 3H).

(S)-8,8-dimethyl-2-oxo-7,8-dihydro-2H,6H-pyrano[3,2-g]chromen-7-yl (E)-3-(3-acetoxyphenyl) acrylate (Compound 14; SNU-C14)

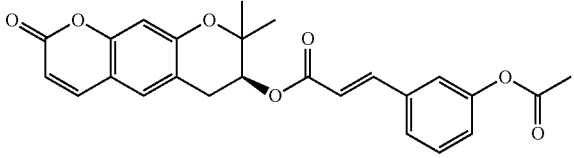 [SMILES: CC(=O)Oc1cccc(/C=C/C(=O)O[C@H]2Cc3cc4ccc(=O)oc4cc3OC2(C)C)c1]

$^1$H NMR (CDCl$_3$, 400 MHZ): δ ppm 7.63 (d, J=16.0 Hz, 1H), 7.59 (d, J=9.5 Hz, 1H), 7.42-7.33 (m, 2H), 7.25-7.22 (m, 1H), 7.17 (s, 1H), 7.11 (app.dt, J=7.4, 2.1 Hz, 1H), 6.83 (s, 1H), 6.40 (d, J=16.0 Hz, 1H), 6.24 (d, J=9.5 Hz, 1H), 5.19 (app.t, J=4.7 Hz, 1H), 3.24 (ddd, J=17.2, 4.7, 1.2 Hz, 1H), 2.93 (dd, J=17.2, 4.5 Hz, 1H), 2.30 (s, 3H), 1.43 (s, 3H), 1.39 (s, 3H).

(S)-8,8-dimethyl-2-oxo-7,8-dihydro-2H,6H-pyrano[3,2-g]chromen-7-yl 3-(4-acetoxy-3-methoxyphenyl) propanoate (Compound 15; SNU-C15)

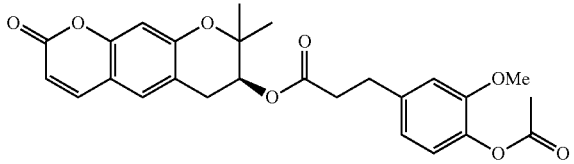 [SMILES: COc1cc(CCC(=O)O[C@H]2Cc3cc4ccc(=O)oc4cc3OC2(C)C)ccc1OC(C)=O]

$^1$H NMR (CDCl$_3$, 400 MHZ): δ ppm 7.58 (d, J=9.5, 0.8 Hz, 1H), 7.10 (s, 1H), 6.87 (dd, J=7.9, 1.1 Hz, 1H), 6.77 (d, 1H), 6.74-6.65 (m, 2H), 6.23 (dd, J=9.5, 2.2 Hz, 1H), 5.02 (app.t, J=4.7 Hz, 1H), 3.74 (d, J=1.2 Hz, 3H), 3.10 (ddd, J=17.2, 4.8, 1.1 Hz, 1H), 2.90 (t, J=7.5 Hz, 2H), 2.72-2.60 (m, 3H), 2.30 (d, J=1.3 Hz, 3H), 1.31 (s, 3H), 1.30 (s, 3H).

(S)-8,8-dimethyl-2-oxo-7,8-dihydro-2H,6H-pyrano[3,2-g]chromen-7-yl (E)-3-(4-acetoxy-3-methoxyphenyl) acrylate (Compound 17; SNU-C17)

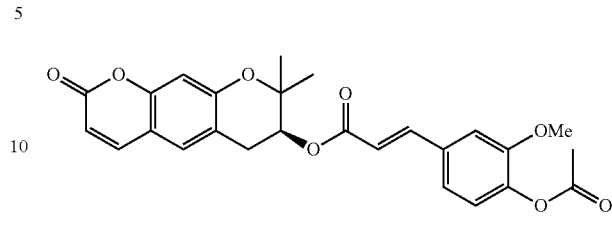

$^1$H NMR (CD$_2$Cl$_2$, 600 MHz): δ ppm 7.67-7.56 (m, 2H), 7.21 (s, 1H), 7.14-7.09 (m, 2H), 7.03 (d, J=8.0 Hz, 1H), 6.78 (s, 1H), 6.41 (d, J=16.0 Hz, 1H), 6.19 (d, J=9.5 Hz, 1H), 5.20 (app.t, J=4.7 Hz, 1H), 3.82 (s, 3H), 3.26 (ddd, J=17.3, 4.8, 1.2 Hz, 1H), 2.95 (dd, J=17.3, 4.5 Hz, 1H), 2.27 (s, 3H), 1.43 (s, 3H), 1.38 (s, 3H).

(S)-8,8-dimethyl-2-oxo-7,8-dihydro-2H,6H-pyrano[3,2-g]chromen-7-yl (E)-3-(3,4-difluorophenyl) acrylate (Compound 18; SNU-C18)

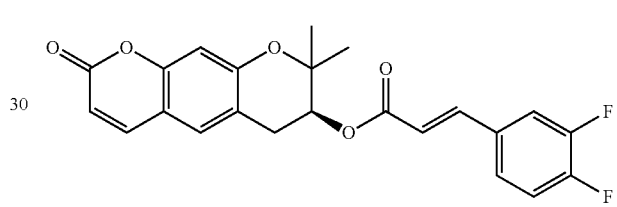

$^1$H NMR (CDCl$_3$, 400 MHZ): δ ppm 7.62-7.53 (m, 2H), 7.32 (ddd, J=11.1, 7.6, 2.2 Hz, 1H), 7.24-7.11 (m, 3H), 6.83 (s, 1H), 6.33 (d, J=16.0, 1H), 6.24 (d, J=9.4 Hz, 1H), 5.19 (app.t, J=4.7 Hz, 1H), 3.25 (ddd, J=17.4, 4.8, 1.1 Hz, 1H), 2.93 (dd, J=17.4, 4.5 Hz, 1H), 1.43 (s, 3H), 1.39 (s, 3H).

(S,E)-7-((3-(3-methoxy-4-nitrophenyl) allyl)oxy)-8,8-dimethyl-7,8-dihydro-2H,6H-pyrano[3,2-g]chromen-2-one (Compound 19; PRG-A-04)

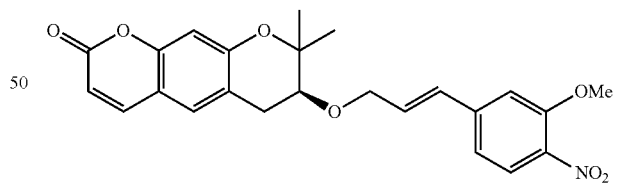

$^1$H NMR (CDCl$_3$, 400 MHz): δ ppm 7.85 (d, J=8.4 Hz, 1H), 7.57 (d, J=9.5 Hz, 1H), 7.16 (s, 1H), 7.05-6.97 (m, 2H), 6.78 (s, 1H), 6.60 (app.dt, J=15.9, 1.7 Hz, 1H), 6.40 (app.dt, J=15.9, 5.5 Hz, 1H), 6.22 (d, J=9.4 Hz, 1H), 4.39 (ddd, J=13.6, 5.4, 1.7 Hz, 1H), 4.24 (ddd, J=13.4, 5.5, 1.6 Hz, 1H), 3.97 (s, 3H), 3.59 (dd, J=7.1, 4.9 Hz, 1H), 3.11 (dd, J=16.7, 4.9 Hz, 1H), 2.87 (dd, J=16.7, 7.2 Hz, 1H), 1.43 (s, 3H), 1.38 (s, 3H).

As described above in detail a specific part of the present invention, for those skilled in the art, it is clear that this specific description is only a preferred example, and the scope of the present invention is not limited thereby. Accordingly, the substantial scope of the present invention will be defined by the appended claims and their equivalents.

What is claimed is:

1. A method of treating amyotrophic lateral sclerosis comprising:
administering to a subject a therapeutically effective amount of a pharmaceutical composition comprising a compound represented by Formula 2 below or a salt thereof:

[Formula 2]

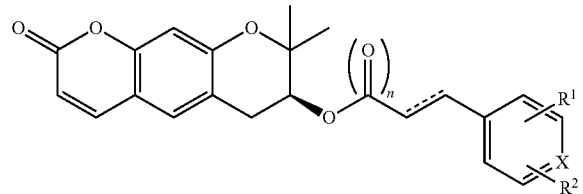

wherein, in Formula 2 above,
⎯⎯⎯ is a single bond or a double bond,
n is an integer from 0 to 1,
X is CH or N, and
R¹ and R² are the same or each different and are selected from the group consisting of hydrogen, (C1-C4) alkyl, (C1-C4) alkoxy, hydroxy, halo, nitro, cyano, and (C1-C4) alkylcarboxy.

2. The method of claim 1, wherein, in the compound, when ⎯⎯⎯ is the single bond, n is 1, X is CH, and R¹ and R² are the same or each different and are selected from the group consisting of (C1-C4) alkoxy, hydroxy, and (C1-C4) alkylcarboxy.

3. The method of claim 1, wherein, in the compound, when ⎯⎯⎯ is the double bond, n is an integer from 0 to 1, X is CH or N, and R¹ and R² are the same or each different and are selected from the group consisting of hydrogen, (C1-C4) alkoxy, hydroxy, halo, nitro, and (C1-C4) alkylcarboxy.

4. The method of claim 1, wherein the compound is selected from the group consisting of(S)
(S)-8,8-dimethyl-2-oxo-7,8-dihydro-2H,6H-pyrano[3,2-g]chromen-7-yl (E)-3-(4-hydroxy-3-methoxyphenyl) acrylate,
(S,E)-7-((3-(4-hydroxy-3-methoxyphenyl) allyl)oxy)-8,8-dimethyl-7,8-dihydro-2H,6H-pyrano[3,2-g]chromen-2-one,
(S)-8,8-dimethyl-2-oxo-7,8-dihydro-2H,6H-pyrano[3,2-g]chromen-7-yl 3-(4-hydroxy-3-methoxyphenyl) propanoate,
(S)-8,8-dimethyl-2-oxo-7,8-dihydro-2H,6H-pyrano[3,2-g]chromen-7-yl (E)-3-(3,4-dimethoxyphenyl) acrylate,
(S)-8,8-dimethyl-2-oxo-7,8-dihydro-2H,6H-pyrano[3,2-g]chromen-7-yl 3-(3,4-dimethoxyphenyl) propanoate,
(S)-8,8-dimethyl-2-oxo-7,8-dihydro-2H,6H-pyrano[3,2-g]chromen-7-yl (E)-3-(pyridin-4-yl) acrylate,
(S)-8,8-dimethyl-2-oxo-7,8-dihydro-2H,6H-pyrano[3,2-g]chromen-7-yl (E)-3-(3-hydroxyphenyl) acrylate,
(S)-8,8-dimethyl-2-oxo-7,8-dihydro-2H,6H-pyrano[3,2-g]chromen-7-yl (E)-3-(4-fluorophenyl) acrylate,
(S,E)-7-((3-(4-fluorophenyl) allyl)oxy)-8,8-dimethyl-7,8-dihydro-2H,6H-pyrano[3,2-g]chromen-2-one,
(S)-8,8-dimethyl-2-oxo-7,8-dihydro-2H,6H-pyrano[3,2-g]chromen-7-yl (E)-3-(3-acetoxyphenyl) acrylate,
(S)-8,8-dimethyl-2-oxo-7,8-dihydro-2H,6H-pyrano[3,2-g]chromen-7-yl 3-(4-acetoxy-3-methoxyphenyl) propanoate,
(S)-8,8-dimethyl-2-oxo-7,8-dihydro-2H,6H-pyrano[3,2-g]chromen-7-yl (E)-3-(4-acetoxy-3-methoxyphenyl) acrylate,
(S)-8,8-dimethyl-2-oxo-7,8-dihydro-2H,6H-pyrano[3,2-g]chromen-7-yl (E)-3-(3,4-difluorophenyl) acrylate, and
(S,E)-7-((3-(3-methoxy-4-nitrophenyl) allyl)oxy)-8,8-dimethyl-7,8-dihydro-2H,6H-pyrano[3,2-g]chromen-2-one.

5. The method of claim 1, wherein the pharmaceutical composition inhibits aggregation and misfolding of superoxide dismutase 1 (SOD1).

6. A method of improving amyotrophic lateral sclerosis comprising:
administering to a subject an effective mount of a health functional food composition comprising a compound represented by Formula 2 below or a salt thereof:

[Formula 2]

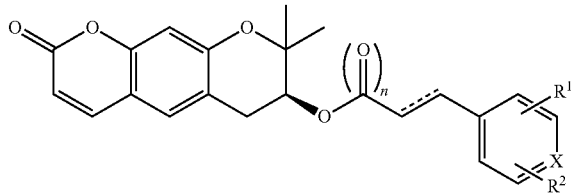

wherein, in Formula 2 above,
⎯⎯⎯ is a single bond or a double bond,
n is an integer from 0 to 1,
X is CH or N, and
R¹ and R² are the same or each different and are selected from the group consisting of hydrogen, (C1-C4) alkyl, (C1-C4) alkoxy, hydroxy, halo, nitro, cyano, and (C1-C4) alkylcarboxy.

7. The method of claim 6, wherein, in the compound, when ⎯⎯⎯ is the single bond, n is 1, and X is CH, and R¹ and R² are the same or each different and are selected from the group consisting of (C1-C4) alkoxy, hydroxy, and (C1-C4) alkylcarboxy.

8. The method of claim 6, wherein, in the compound, when ⎯⎯⎯ is the double bond, n is an integer from 0 to 1, X is CH or N, and R¹ and R² are the same or each different and are selected from the group consisting of hydrogen, (C1-C4) alkoxy, hydroxy, halo, nitro, and (C1-C4) alkylcarboxy.

9. The method of claim 6, wherein the compound is selected from the group consisting of(S)
(S)-8,8-dimethyl-2-oxo-7,8-dihydro-2H,6H-pyrano[3,2-g]chromen-7-yl (E)-3-(4-hydroxy-3-methoxyphenyl) acrylate,
(S,E)-7-((3-(4-hydroxy-3-methoxyphenyl) allyl)oxy)-8,8-dimethyl-7,8-dihydro-2H,6H-pyrano[3,2-g]chromen-2-one,
(S)-8,8-dimethyl-2-oxo-7,8-dihydro-2H,6H-pyrano[3,2-g]chromen-7-yl 3-(4-hydroxy-3-methoxyphenyl) propanoate,
(S)-8,8-dimethyl-2-oxo-7,8-dihydro-2H,6H-pyrano[3,2-g]chromen-7-yl (E)-3-(3,4-dimethoxyphenyl) acrylate,
(S)-8,8-dimethyl-2-oxo-7,8-dihydro-2H,6H-pyrano[3,2-g]chromen-7-yl 3-(3,4-dimethoxyphenyl) propanoate, (S)-8,8-dimethyl-2-oxo-7,8-dihydro-2H,6H-pyrano[3,2-g]chromen-7-yl (E)-3-(pyridin-4-yl) acrylate,
(S)-8,8-dimethyl-2-oxo-7,8-dihydro-2H,6H-pyrano[3,2-g]chromen-7-yl (E)-3-(3-hydroxyphenyl) acrylate,
(S)-8,8-dimethyl-2-oxo-7,8-dihydro-2H,6H-pyrano[3,2-g]chromen-7-yl (E)-3-(4-fluorophenyl) acrylate,
(S,E)-7-((3-(4-fluorophenyl) allyl)oxy)-8,8-dimethyl-7,8-dihydro-2H,6H-pyrano[3,2-g]chromen-2-one,
(S)-8,8-dimethyl-2-oxo-7,8-dihydro-2H,6H-pyrano[3,2-g]chromen-7-yl (E)-3-(3-acetoxyphenyl) acrylate,
(S)-8,8-dimethyl-2-oxo-7,8-dihydro-2H,6H-pyrano[3,2-g]chromen-7-yl 3-(4-acetoxy-3-methoxyphenyl) propanoate,
(S)-8,8-dimethyl-2-oxo-7,8-dihydro-2H,6H-pyrano[3,2-g]chromen-7-yl (E)-3-(4-acetoxy-3-methoxyphenyl) acrylate,
(S)-8,8-dimethyl-2-oxo-7,8-dihydro-2H,6H-pyrano[3,2-g]chromen-7-yl (E)-3-(3,4-difluorophenyl) acrylate, and
(S,E)-7-((3-(3-methoxy-4-nitrophenyl) allyl)oxy)-8,8-dimethyl-7,8-dihydro-2H,6H-pyrano[3,2-g]chromen-2-one.

* * * * *